US012612338B2

(12) United States Patent
    Takai

(10) Patent No.:   US 12,612,338 B2
(45) Date of Patent:    Apr. 28, 2026

(54) ZIRCONIA POWDER, ZIRCONIA SINTERED BODY, AND METHOD FOR PRODUCING ZIRCONIA SINTERED BODY

(71) Applicant: DAIICHI KIGENSO KAGAKU KOGYO CO., LTD., Osaka (JP)

(72) Inventor: Masayuki Takai, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 995 days.

(21) Appl. No.: 17/755,491

(22) PCT Filed: Oct. 6, 2021

(86) PCT No.: PCT/JP2021/036911
§ 371 (c)(1),
(2) Date: Apr. 29, 2022

(87) PCT Pub. No.: WO2022/075346
PCT Pub. Date: Apr. 14, 2022

(65) Prior Publication Data
US 2022/0380261 A1    Dec. 1, 2022

(30) Foreign Application Priority Data
Oct. 9, 2020   (JP) ................................. 2020-170949

(51) Int. Cl.
   *C04B 35/488*    (2006.01)
   *C01G 25/00*    (2006.01)
(52) U.S. Cl.
   CPC .......... *C04B 35/488* (2013.01); *C01G 25/006* (2013.01); *C04B 2235/3208* (2013.01);
      (Continued)
(58) Field of Classification Search
None
See application file for complete search history.

(56) References Cited

U.S. PATENT DOCUMENTS 4,900,701 A   2/1990  Morishita et al.
2005/0079971 A1   4/2005  Nawa
      (Continued)

FOREIGN PATENT DOCUMENTS

CN    111285679 A   6/2020
EP    3 345 870 A1   7/2018
      (Continued)

OTHER PUBLICATIONS

Imtiaz et al., "Preventing Agglomeration of CuO-Based Oxygen Carriers for Chemical Looping Applications," ACS Sustainable Chemistry & Engineering 9 (2021), pp. 5972-5980 (Year: 2021).*
      (Continued)

*Primary Examiner* — Jennifer A Smith
*Assistant Examiner* — Paul Alan Forsyth
(74) *Attorney, Agent, or Firm* — Studebaker Brackett PLLC

(57)         ABSTRACT

A zirconia powder in which when a stabilizer is $Y_2O_3$, a content thereof is 1.4 mol % or more and less than 2.0 mol %; when the stabilizer is $Er_2O_3$, a content thereof is 1.4 mol % or more and 1.8 mol % or less; when the stabilizer is $Yb_2O_3$, a content thereof is 1.4 mol % or more and 1.8 mol % or less; and when the stabilizer is CaO, a content thereof is 3.5 mol % or more and 4.5 mol % or less; and in a range of 10 nm or more and 200 nm or less in a pore distribution, a peak top diameter of a pore volume distribution is 20 nm or more and 120 nm or less, a pore volume is 0.2 ml/g or more and less than 0.5 ml/g, and a pore distribution width is 30 nm or more and 170 nm or less.

19 Claims, 3 Drawing Sheets

(52) U.S. Cl.

CPC ................ *C04B 2235/3224* (2013.01); *C04B 2235/3246* (2013.01); *C04B 2235/5436* (2013.01)

(56) References Cited

U.S. PATENT DOCUMENTS

| | | | | |
|---|---|---|---|---|
| 2014/0370453 | A1 | 12/2014 | Fujisaki et al. | |
| 2016/0081777 | A1* | 3/2016 | Yamada | C04B 35/488 |
| | | | | 428/220 |
| 2016/0368826 | A1* | 12/2016 | Calado Da Silva | C04B 35/486 |
| 2018/0282225 | A1* | 10/2018 | Takai | C04B 35/486 |
| 2022/0089500 | A1* | 3/2022 | Kunisada | C01G 25/02 |

FOREIGN PATENT DOCUMENTS

| | | |
|---|---|---|
| JP | H05-070224 A | 3/1993 |
| JP | H06-67785 B2 | 8/1994 |
| JP | 2005-097094 A | 4/2005 |
| JP | 2006-240928 A | 9/2006 |
| JP | 2007-332026 A | 12/2007 |
| JP | 2011-020873 A | 2/2011 |
| JP | 2015-093813 A | 5/2015 |
| JP | 2017-516741 A | 6/2017 |
| JP | 2018-080064 A | 5/2018 |
| WO | 86/05174 A1 | 9/1986 |
| WO | 2015/145354 A1 | 10/2015 |
| WO | 2020/196650 A1 | 10/2020 |

OTHER PUBLICATIONS

Hayakawa M. et al., "Size-Dependence of Martensite Transformation Temperature of Yttria-Doped Zirconia and the Distribution of Nucleation Sites", Materials Transactions, vol. 49, No. 8, pp. 1785-1790, Jul. 9, 2008.

Experimenter: Daiki Kusunoki, "Experimental Report", Jun. 10, 2023, total 3 pages; with English translation.

JIS R1607 : 2015 (Room temperature fracture toughness test method for fine ceramics), Mar. 20, 2015, Japanese Standards Association, pp. 8-10; with partial English translation.

Chikaishi and Yamaguchi, "Powder Physical Properties", SCAS News 2001—II, vol. 14, Jul. 26, 2001, pp. 11-14; with partial English translation.

Notification of Transmittal of Translation of the International Preliminary Report on Patentability and Translation of Written Opinion of the International Searching Authority; PCT/JP2021/036911; mailed on Apr. 20, 2023.

An Office Action; "Notice of Reasons for Refusal," mailed by the Japanese Patent Office on Oct. 4, 2022, which corresponds to Japanese Patent Application No. 2022-523220 and is related to U.S. Appl. No. 17/755,491; with English language translation.

Communication Pursuant to Article 94(3) EPC issued by the European Patent Office on Jul. 3, 2024, which corresponds to EP21877645.8-1014 and is related to U.S. Appl. No. 17/755,491.

An Office Action mailed by China National Intellectual Property Administration on Aug. 28, 2023, which corresponds to Chinese Patent Application No. 202180006966.4 and is related to U.S. Appl. No. 17/755,491; with English language translation.

The extended European search report issued by the European Patent Office on Oct. 16, 2023, which corresponds to European Patent Application No. 21877645.8-1108 and is related to U.S. Appl. No. 17/755,491.

A Notice of Reasons for Revocation mailed by the Japanese Patent Office on Oct. 20, 2023, which corresponds to Japanese Patent Application No. 2022-523220 (Japanese Patent No. 7195481) and is related to U.S. Appl. No. 17/755,491; with English language translation.

International Search Report issued in PCT/JP2021/036911; mailed Dec. 14, 2021.

Communication Pursuant to Article 94(3) EPC issued by the European Patent Office on Jun. 11, 2025, which corresponds to EP 21 877 645.8-1014 and is related to U.S. Appl. No. 17/755,491.

* cited by examiner

CRACK LENGTH -1

CRACK LENGTH -2

CRACK LENGTH -4

CRACK
LENGTH -3

X-AXIS INDENTATION LENGTH

Y-AXIS INDENTATION LENGTH

Y-AXIS CRACK LENGTH

X-AXIS CRACK LENGTH

ZIRCONIA POWDER, ZIRCONIA SINTERED BODY, AND METHOD FOR PRODUCING ZIRCONIA SINTERED BODY

TECHNICAL FIELD

The present invention relates to a zirconia powder, a method for producing a zirconia powder, a zirconia sintered body, and a method for producing a zirconia sintered body.

BACKGROUND ART

Zirconia is used in various applications with utilization of its mechanical strength, translucency, refractive index, etc. In recent years, for the purpose of further enhancement in functions of electronic devices, biomaterials, and sliding parts, high strength and resistance to hydrothermal degradation are naturally required, and further high toughness is also required.

Patent Document 1 discloses a method for producing a zirconia sintered body in which a $ZrO_2$ powder with a particle diameter of 0.1 to 2.0 μm containing 2 to 4 mol % of $Y_2O_3$ as a stabilizer is mixed with 2 to 10% by weight of a $ZrO_2$ fine powder with a particle diameter of 0.05 μm or less containing 2 to 4 mol % of $Y_2O_3$ as a stabilizer to afford a mixed powder, the mixed powder is then granulated, the resulting granulated powder is molded, the resulting molded body is then preliminarily sintered to a relative density of 96 to 98% under normal pressure, and then the molded body is subjected to a hot isostatic press treatment at a temperature of 1480° C. or lower (see claim 1). In Patent Document 1, it is intended to obtain a zirconia sintered body having high toughness by utilizing a microcrack strengthening mechanism. Specifically, attempts have been made to obtain a zirconia sintered body with high toughness by introducing relatively large cracks in the form of closed pores into the sintered body, subjecting the closed pores to hot isostatic press (HIP) treatment to make the size of the pores smaller than the original size, and forming defects that make a microcrack strengthening mechanism develop (see paragraph[0007]).

PRIOR ART DOCUMENT

Patent Documents

Patent Document 1: JP-A-05-070224

SUMMARY OF THE INVENTION

Problems to be Solved by the Invention

However, the production method of Patent Document 1 has a problem that it is complicated and difficult to control the particle diameters of the two types of powders. In addition, HIP sintering has a problem of low versatility.

The present invention has been devised in view of the above-described problems, and an object of the present invention is to provide a zirconia powder from which a zirconia sintered body having high toughness can be obtained. The present invention provides a zirconia sintered body having high toughness. Another object of the present invention is to provide a method for producing the zirconia sintered body.

Means for Solving the Problems

In general, it is known that the monoclinic crystal phase ratio in a zirconia sintered body increases as the amount of s stabilizer decreases. Here, the fact that the monoclinic crystal phase ratio increases means that much transformation from tetragonal crystal phase to monoclinic crystal phase occurs. When the volume changes with the transformation from the tetragonal crystal phase to the monoclinic crystal phase, cracks are generated in the zirconia sintered body. For this reason, as to the amount of the stabilizer, for example, when $Y_2O_3$ is used, this has conventionally been used in a content of about 3.0 mol %. As described above, conventionally, in a case where the utilization of a microcrack strengthening mechanism is not studied, it is usual to make a certain large amount (about 3.0 mol %) of a stabilizer to be contained.

On the other hand, the present inventor has found that as a result of adjusting the ratio of the monoclinic crystal phase contained in the crystal phase of a zirconia sintered body to 0.2% or more and 5% or less, surprisingly, crack generation in a resulting zirconia sintered body is remarkably suppressed whereas microcracks can be easily formed and a toughness improving effect due to a microcrack strengthening mechanism is obtained. In order to adjust the monoclinic crystal phase ratio in the range of 0.2% or more and 5% or less, it was found preferable to make the stabilizer to be contained at a content within a specific range lower than the conventional.

Since the microcrack strengthening mechanism is a conventionally known mechanism, a detailed description thereof is omitted herein.

Furthermore, the present inventor found that it is difficult to suitably control the monoclinic crystal phase ratio in the zirconia sintered body only by the amount of the stabilizer.

As a result of intensive studies, the present inventor surprisingly found that adjusting the amount of a stabilizer contained in a zirconia powder to within a specific range and also adjusting the pore distribution to within a specific range make it easy to adjust the ratio of the monoclinic crystal phase contained in the crystal phase of the zirconia sintered body obtained by sintering of the zirconia powder to be 0.2% or more and 5% or less.

Based on the above findings, the present inventor found that it is possible to easily obtain a zirconia sintered body having high toughness by adopting the following configuration, and has accomplished the present invention.

That is, the zirconia powder according to the present invention comprises a stabilizer, in which the stabilizer is CaO, $Y_2O_3$, $Er_2O_3$, or $Yb_2O_3$, when the stabilizer is $Y_2O_3$, a content of the $Y_2O_3$ based on an entire amount of the zirconia powder is 1.4 mol % or more and less than 2.0 mol %, when the stabilizer is $Er_2O_3$, a content of the $Er_2O_3$ based on an entire amount of the zirconia powder is 1.4 mol % or more and 1.8 mol % or less, when the stabilizer is $Yb_2O_3$, a content of the $Yb_2O_3$ based on an entire amount of the zirconia powder is 1.4 mol % or more and 1.8 mol % or less, and when the stabilizer is CaO, a content of the CaO based on an entire amount of the zirconia powder is 3.5 mol % or more and 4.5 mol % or less, and in a range of 10 nm or more and 200 nm or less in a pore distribution based on a mercury intrusion method, a peak top diameter in a pore volume distribution is 20 nm or more and 120 nm or less, a pore volume is 0.2 ml/g or more and less than 0.5 ml/g, and a pore distribution width is 30 nm or more and 170 nm or less.

In the case where the stabilizer is $Y_2O_3$ in the zirconia powder according to the above configuration, when the $Y_2O_3$ is contained in a range of 1.4 mol % or more and less than 2.0 mol %, it is easy to adjust the ratio of the monoclinic crystal phase contained in the crystal phase of the zirconia sintered body obtained by sintering of the zirconia powder to be 0.2% or more and 5% or less.

Similarly in the case where the stabilizer is $Er_2O_3$, when the $Er_2O_3$ is contained in a range of 1.4 mol % or more and 1.8 mol % or less, it is easy to adjust the ratio of the monoclinic crystal phase contained in the crystal phase of the zirconia sintered body obtained by sintering of the zirconia powder to be 0.2% or more and 5% or less.

Similarly in the case where the stabilizer is $Yb_2O_3$, when the $Yb_2O_3$ is contained in a range of 1.4 mol % or more and 1.8 mol % or less, it is easy to adjust the ratio of the monoclinic crystal phase contained in the crystal phase of the zirconia sintered body obtained by sintering of the zirconia powder to be 0.2% or more and 5% or less.

Similarly in the case where the stabilizer is CaO, when the CaO is contained in a range of 3.5 mol % or more and 4.5 mol % or less, it is easy to adjust the ratio of the monoclinic crystal phase contained in the crystal phase of a zirconia sintered body obtained by sintering of the zirconia powder to be 0.2% or more and 5% or less.

According to the zirconia powder according to the above configuration, in a range of 10 nm or more and 200 nm or less in a pore distribution based on a mercury intrusion method, a peak top diameter in a pore volume distribution is 20 nm or more and 120 nm or less, a pore volume is 0.2 ml/g or more and less than 0.5 ml/g, and a pore distribution width is 30 nm or more and 170 nm or less, so that it is easy to adjust the ratio of the monoclinic crystal phase contained in the crystal phase of the zirconia sintered body obtained by sintering of the zirconia powder to be 0.2% or more and 5% or less.

It is unclear why the ratio of the monoclinic crystal phase contained in the crystal phase of the zirconia sintered body is easily adjusted to 0.2% or more and 5% or less by controlling the peak top diameter, the pore volume, and the pore distribution width to within the above numerical ranges, but the present inventor infers that controlling powder properties (pore volume and pore distribution width) makes low-temperature sintering possible. That is, under sintering conditions at a high temperature exceeding 1350° C., when the amount of the stabilizer is reduced in order to obtain high toughness, the amount of phase transition from the tetragonal crystal phase to the monoclinic crystal phase during temperature drop for sintering becomes excessively large, so that large cracks are generated in the sintered body due to volume change. So, by controlling the powder properties (pore volume and pore distribution width), it becomes possible to perform sintering at a low temperature and the prescribed monoclinic crystal phase ratio (0.2% or more and 5% or less) can be achieved.

It is apparent from comparison between Examples and Comparative Examples that when the peak top diameter, the pore volume, and the pore distribution width are controlled to within the above numerical ranges, the ratio of the monoclinic crystal phase contained in the crystal phase of a zirconia sintered body is easily adjusted to 0.2% or more and 5% or less.

In addition, the zirconia powder with the above configuration does not need mixing of two types of powders and also does not need sintering by HIP, so that it is possible to easily obtain therefrom a zirconia sintered body having high toughness.

It is preferable in the above configuration that a specific surface area is 10 $m^2$/g or more and 50 $m^2$/g or less and a particle diameter $D_{50}$ is 0.1 μm or more and 0.7 μm or less.

When the specific surface area is 10 $m^2$/g or more and 50 $m^2$/g or less, the zirconia powder is superior in sinterability. When the particle diameter $D_{50}$ is 0.1 μm or more and 0.7 μm or less, the zirconia powder is superior in sinterability.

It is preferable in the above configuration that the peak top diameter is 20 nm or more and 70 nm or less and the pore distribution width is 40 nm or more and 105 nm or less.

When the peak top diameter is 20 nm or more and 70 nm or less and the pore distribution width is 40 nm or more and 105 nm or less, it is easier to adjust the ratio of the monoclinic crystal phase contained in the crystal phase of a zirconia sintered body obtained by sintering the zirconia powder to 0.2% or more and 5% or less.

It is preferable in the above configuration that when the stabilizer is $Y_2O_3$, the content of the $Y_2O_3$ is 1.4 mol % or more and 1.9 mol % or less.

When the content of $Y_2O_3$ is 1.4 mol % or more and 1.9 mol % or less, it is easier to adjust the ratio of the monoclinic crystal phase contained in the crystal phase of a zirconia sintered body obtained by sintering the zirconia powder to 0.2% or more and 5% or less.

It is preferable in the above configuration that when the stabilizer is $Y_2O_3$, the content of the $Y_2O_3$ is 1.4 mol % or more and less than 1.8 mol %.

When the content of $Y_2O_3$ is 1.4 mol % or more and less than 1.8 mol %, it is easier to adjust the ratio of the monoclinic crystal phase contained in the crystal phase of a zirconia sintered body obtained by sintering the zirconia powder to 0.2% or more and 5% or less.

It is preferable in the above configuration that the specific surface area is 20 $m^2$/g or more and 40 $m^2$/g or less.

When the specific surface area is 20 $m^2$/g or more and 40 $m^2$/g or less, the zirconia powder is more improved in sinterability.

It is preferable in the above configuration that the particle diameter $D_{50}$ is 0.1 μm or more and less than 0.3 μm.

When the particle diameter $D_{50}$ is 0.1 μm or more and less than 0.3 μm, the zirconia powder is more improved in sinterability.

In the above configuration, alumina and one or more metal oxides selected from the group consisting of metal oxides having a Tammann temperature of 1200° C. or lower may be contained in an amount of 0.005 mass % or more and 2 mass % or less.

When alumina and one or more metal oxides selected from the group consisting of metal oxides having a Tammann temperature of 1200° C. or lower are contained within the above numerical range, the metal oxides function as a sintering aid, and therefore the zirconia powder is superior in low-temperature sinterability.

Alumina functions as a sintering aid by removing pores by inhibiting grain growth of zirconia by being present at the grain boundaries of the primary particles and the secondary particles.

In addition, the metal oxide having a Tammann temperature of 1200° C. or lower (absolute temperature of 1473.15 K or lower) has a certain degree of fluidity at a temperature during low-temperature sintering (1200° C. to 1350° C.), and therefore the metal oxide functions as a sintering aid by promoting the joining of the primary particles and the secondary particles to increase the sintering rate.

Here, when the Tammann temperature expressed in absolute temperature is denoted by Td and the melting point of a solid expressed in absolute temperature is denoted by Tm, there is a relationship of Td=0.33 Tm for metals, Td=0.757 Tm for oxides or the like, and Td=0.90 Tm for covalent compounds (these are referred to as Tammann's law).

Thus, in the present description, the "Tammann temperature" refers to a value according to the Tamman's law.

In the above configuration, the zirconia powder may contain one or more elements selected from the group consisting of Fe, V, Er, Mn, Co, Tb, Zn, Cu, and Ti.

When the zirconia sintered body contains one or more elements selected from the group consisting of Fe, V, Er, Mn, Co, Tb, Zn, Cu, and Ti, the zirconia sintered body can be suitably colored.

In the zirconia sintered body according to the present invention:

a ratio of the monoclinic crystal phase contained in the crystal phase is 0.2% or more and 5% or less, a length of a crack generated in the sintered body when a load is set to 50 kgf in toughness measurement by an IF method is 1 μm or more and 90 μm or less, and a three-point bending strength is 80 kg/mm$^2$ or more and 150 kg/mm$^2$ or less.

According to the zirconia sintered body with the above configuration, since the ratio of the monoclinic crystal phase contained in the crystal phase is 0.2% or more and 5% or less, a microcrack strengthening mechanism can be developed. One of the features of the present invention is that the development of the microcrack strengthening mechanism is controlled by the monoclinic crystal phase ratio.

In addition, since the crack length is 1 μm or more and 90 μm or less, the zirconia sintered body is superior in toughness. In addition, since the three-point bending strength is 80 kg/mm$^2$ or more and 150 kg/mm$^2$ or less, the zirconia sintered body is superior in strength.

It is preferable in the above configuration that the relative sintered density is 98.5% or more.

When the relative sintered density is 98.5% or more, the zirconia sintered body has higher strength.

It is preferable in the above configuration that the zirconia sintered body has a toughness value of 10 MPa·m$^{0.5}$ or more and 40 MPa·m$^{0.5}$ or less when a load is 50 kgf in toughness measurement by an IF method.

When the toughness value is 10 MPa·m$^{0.5}$ or more and 40 MPa·m$^{0.5}$ or less, it can be said that the zirconia sintered body has sufficiently high toughness.

It is preferable in the above configuration that a stabilizer is contained and the stabilizer is one or more compounds selected from the group consisting of CaO, Y$_2$O$_3$, Er$_2$O$_3$, and Yb$_2$O$_3$.

When the stabilizer is one or more compounds selected from the group consisting of CaO, Y$_2$O$_3$, Er$_2$O$_3$, and Yb$_2$O$_3$, it is easy to adjust the ratio of the monoclinic crystal phase contained in the crystal phase of the zirconia sintered body to 0.2% or more and 5% or less.

It is preferable in the above configuration that when the stabilizer is only Y$_2$O$_3$, a content of the Y$_2$O$_3$ based on an entire amount of the zirconia powder is 1.4 mol % or more and less than 2.0 mol %, when the stabilizer is only Er$_2$O$_3$, a content of the Er$_2$O$_3$ based on an entire amount of the zirconia powder is 1.4 mol % or more and 1.8 mol % or less, when the stabilizer is only Yb$_2$O$_3$, a content of the Yb$_2$O$_3$ based on an entire amount of the zirconia powder is 1.4 mol % or more and 1.8 mol % or less, and when the stabilizer is only CaO, a content of the CaO based on an entire amount of the zirconia powder is 3.5 mol % or more and 4.5 mol % or less.

In the case where the stabilizer is only Y$_2$O$_3$, when the Y$_2$O$_3$ is contained in the range of 1.4 mol % or more and less than 2.0 mol %, it is easy to adjust the ratio of the monoclinic crystal phase contained in the crystal phase of the zirconia sintered body to 0.2% or more and 5% or less.

Similarly, in a case where the stabilizer is Er$_2$O$_3$ only, when the Er$_2$O$_3$ is contained in the range of 1.4 mol % or more and 1.8 mol % or less, it is easy to adjust the ratio of the monoclinic crystal phase contained in the crystal phase of the zirconia sintered body to 0.2% or more and 5% or less.

Similarly, in the case where the stabilizer is only Yb$_2$O$_3$, when Yb$_2$O$_3$ is contained in the range of 1.4 mol % or more and 1.8 mol % or less, it is easy to adjust the ratio of the monoclinic crystal phase contained in the crystal phase of the zirconia sintered body to 0.2% or more and 5% or less.

Similarly, in the case where the stabilizer is only CaO, when the CaO is contained in the range of 3.5 mol % or more and 4.5 mol % or less, it is easy to adjust the ratio of the monoclinic crystal phase contained in the crystal phase of the zirconia sintered body to 0.2% or more and 5% or less.

In the above configuration, the zirconia powder may contain one or more elements selected from the group consisting of Fe, V, Mn, Co, Zn, Cu, and Ti.

When one or more elements selected from the group consisting of Fe, V, Mn, Co, Zn, Cu, and Ti are contained, the zirconia sintered body can be suitably colored.

In the above configuration, the monoclinic crystal phase ratio of a surface after exposure to a hydrothermal condition at 134° C. for 75 hours is preferably 31% or less.

When the monoclinic crystal phase ratio of a surface after exposure to a hydrothermal condition at 134° C. for 75 hours is 31% or less, it can be said that the zirconia sintered body is superior in resistance to hydrothermal degradation.

The method for producing a zirconia sintered body according to the present invention comprises:

step X of molding the zirconia powder to obtain a molded body; and step Y of sintering the molded body under conditions at 1200° C. or higher and 1350° C. or lower and for 1 hour or more and 5 hours or less after the step X.

The zirconia powder contains a specific amount of CaO, Y$_2$O$_3$, Er$_2$O$_3$, or Yb$_2$O$_3$ as a stabilizer.

In the method for producing a zirconia sintered body according to the above configuration, by sintering a zirconia powder in a range of 1200° C. or higher and 1350° C. or lower, the ratio of the monoclinic crystal phase contained in the crystal phase of the obtained zirconia sintered body can be controlled to within a range of 0.2% or more and 5% or less. This is also clear from Examples.

Effect of the Invention

According to the present invention, it is possible to provide a zirconia powder from which a zirconia sintered body having high strength and high toughness can be easily obtained. In addition, it is possible to provide a zirconia sintered body having high strength and high toughness. The present invention can provide a method for producing the zirconia sintered body.

MODE FOR CARRYING OUT THE INVENTION

Figure 1:
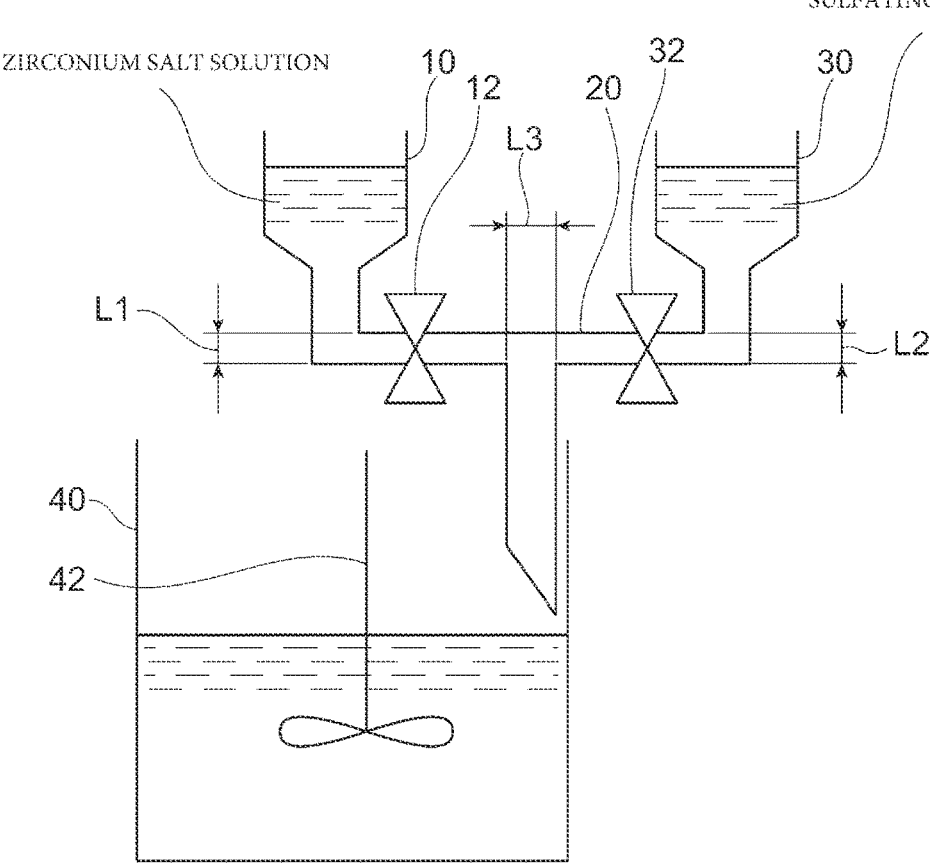
FIG. 1 is a schematic view for explaining a method for producing a zirconia powder according to the present embodiment.

Hereinafter, embodiments of the present invention will be described. However, the present invention is not limited only to these embodiments. In the present description, zirconia (zirconium oxide) is common one, and contains 10 mass % or less of impure metal compounds including hafnia. In the present specification, the terms "comprise" and "contain" include the concepts of "comprise", "contain", "substantially consist of", and "consist of".

[Zirconia Powder]

The zirconia powder according to the present embodiment comprises a stabilizer, in which the stabilizer is CaO, $Y_2O_3$, $Er_2O_3$, or $Yb_2O_3$, when the stabilizer is $Y_2O_3$, a content of the $Y_2O_3$ based on an entire amount of the zirconia powder is 1.4 mol % or more and less than 2.0 mol %, when the stabilizer is $Er_2O_3$, a content of the $Er_2O_3$ based on an entire amount of the zirconia powder is 1.4 mol % or more and 1.8 mol % or less, when the stabilizer is $Yb_2O_3$, a content of the $Yb_2O_3$ based on an entire amount of the zirconia powder is 1.4 mol % or more and 1.8 mol % or less, and when the stabilizer is CaO, a content of the CaO based on an entire amount of the zirconia powder is 3.5 mol % or more and 4.5 mol % or less, and in a range of 10 nm or more and 200 nm or less in a pore distribution based on a mercury intrusion method, a peak top diameter in a pore volume distribution is 20 nm or more and 120 nm or less, a pore volume is 0.2 ml/g or more and less than 0.5 ml/g, and a pore distribution width is 30 nm or more and 170 nm or less.

The zirconia powder comprises primary particles comprising zirconia as a main component. All or some of the primary particles are aggregated to form secondary particles. That is, the zirconia powder comprises primary particles that are not aggregated and secondary particles in which primary particles are aggregated.

It is noted that, in the zirconia powder, the amount of primary particles that do not form secondary particles and exist in the state of unaggregated primary particles is very small, and is, for example, less than 1 mass % of the entire primary particles (namely, the total of unaggregated primary particles and primary particles aggregated and forming secondary particles). That is, the zirconia powder may contain a very small amount of unaggregated primary particles, but most of the zirconia powder is composed of secondary particles.

The phrase "comprising zirconia as a main component" means that the primary particles contain zirconia in an amount of 70 mass % or more based on 100 mass % of the primary particles. That is, in the present description, primary particles comprising zirconia as a main component refer to primary particles containing zirconia in an amount of 70 mass % or more. The content of zirconia contained in the primary particles is preferably 74 mass % or more, more preferably 80 mass % or more, and still more preferably 85 mass % or more.

The zirconia powder according to the present embodiment comprises zirconia as a main component. Specifically, as described above, the zirconia powder contains secondary particles in which primary particles are aggregated and a very small amount of unaggregated primary particles.

The zirconia powder comprises a stabilizer. The stabilizer is contained in the primary particles in a form of solid-dissolving or the like.

The stabilizer is CaO, $Y_2O_3$, $Er_2O_3$, or $Yb_2O_3$. The stabilizer varies depending on the application, and CaO, $Y_2O_3$, and $Yb_2O_3$ are preferable from the viewpoint of cost, coloring, etc. The stabilizer is preferably CaO from the viewpoint of resistance to hydrothermal degradation.

When the stabilizer is $Y_2O_3$, the content of the $Y_2O_3$ based on the entire amount of the zirconia powder is 1.4 mol % or more and less than 2.0 mol %. The content of the $Y_2O_3$ is preferably 1.45 mol % or more, more preferably 1.5 mol % or more, still more preferably 1.55 mol % or more, particularly preferably 1.57 mol % or more, and especially preferably 1.6 mol % or more. The content of the $Y_2O_3$ is preferably 1.9 mol % or less, more preferably less than 1.8 mol %, still more preferably 1.75 mol % or less, particularly preferably 1.7 mol % or less, and especially preferably 1.65 mol % or less.

When the $Y_2O_3$ is contained at a content within a range of 1.4 mol % or more and less than 2.0 mol %, the ratio of the monoclinic crystal phase contained in the crystal phase of a zirconia sintered body obtained by sintering the zirconia powder is easily adjusted to 0.2% or more and 5% or less.

When the stabilizer is $Er_2O_3$, the content of the $Er_2O_3$ based on the entire amount of the zirconia powder is 1.4 mol % or more and 1.8 mol % or less. The content of the $Er_2O_3$ is preferably 1.45 mol % or more, more preferably 1.5 mol % or more, still more preferably 1.55 mol % or more, particularly preferably 1.57 mol % or more, and especially preferably 1.6 mol % or more. The content of the $Er_2O_3$ is preferably 1.9 mol % or less, more preferably less than 1.8 mol %, still more preferably 1.75 mol % or less, particularly preferably 1.7 mol % or less, and especially preferably 1.65 mol % or less.

When the $Er_2O_3$ is contained at a content within a range of 1.4 mol % or more and 1.8 mol % or less, the ratio of the monoclinic crystal phase contained in the crystal phase of a zirconia sintered body obtained by sintering the zirconia powder is easily adjusted to 0.2% or more and 5% or less.

When the stabilizer is $Yb_2O_3$, the content of the $Yb_2O_3$ based on the entire amount of the zirconia powder is 1.4 mol % or more and 1.8 mol % or less. The content of the $Yb_2O_3$ is preferably 1.45 mol % or more, more preferably 1.5 mol % or more, still more preferably mol % or more, particularly preferably 1.53 mol % or more, and especially preferably 1.57 mol % or more. The content of the $Yb_2O_3$ is preferably 1.75 mol % or less, more preferably less than 1.7 mol %, still more preferably 1.65 mol % or less, and particularly preferably 1.63 mol % or less.

When the $Yb_2O_3$ is contained at a content within a range of 1.4 mol % or more and 1.8 mol % or less, the ratio of the monoclinic crystal phase contained in the crystal phase of a zirconia sintered body obtained by sintering the zirconia powder is easily adjusted to 0.2% or more and 5% or less.

When the stabilizer is CaO, when the stabilizer is CaO, the content of the CaO based on the entire amount of the zirconia powder is 3.5 mol % or more and 4.5 mol % or less. The content of the CaO is preferably 3.6 mol % or more, more preferably 3.7 mol % or more, still more preferably 3.8 mol % or more, particularly preferably 3.9 mol % or more, and especially preferably 3.95 mol % or more. The content of the CaO is preferably 4.4 mol % or less, more preferably 4.3 mol % less, still more preferably 4.2 mol % or less, particularly preferably 4.1 mol % or less, and especially preferably 4.05 mol % or less.

When the CaO is contained at a content within a range of 3.5 mol % or more and 4.5 mol % or less, the ratio of the monoclinic crystal phase contained in the crystal phase of a zirconia sintered body obtained by sintering the zirconia powder is easily adjusted to 0.2% or more and 5% or less.

<Pore Distribution>

1. Peak Top Diameter of Interparticle Spaces of Primary Particles

The zirconia powder has a peak top diameter of 20 nm or more and 120 nm or less in a pore volume distribution in a range of 10 nm or more and 200 nm or less in a pore distribution based on a mercury intrusion method. The peak top diameter is preferably 25 nm or more, more preferably 30 nm, still more preferably 32 nm, and particularly preferably 35 nm or more. The peak top diameter is preferably 70 nm or less, more preferably 60 nm or less, still more preferably 57 nm or less, and particularly preferably 54 nm or less.

When there are a plurality of peaks in the range of 10 nm or more and 200 nm or less in the pore distribution, the phrase "the peak top diameter is 20 nm or more and 120 nm or less in the pore volume distribution" as used herein means that all the peak top diameters in the range of 10 nm or more and 200 nm or less in the pore distribution are in the range of 20 nm or more and 120 nm or less.

2. Pore Distribution Width of Interparticle Spaces of Primary Particles

The zirconia powder has a pore distribution width of 30 nm or more and 170 nm or less in a range of 10 nm or more and 200 nm or less in a pore distribution based on a mercury intrusion method. The pore distribution width is preferably 40 nm or more, more preferably 46 nm or more, still more preferably 50 nm or more, and particularly preferably 55 nm or more. The pore distribution width is preferably 105 nm or less, more preferably 95 nm or less, still more preferably 90 nm or less, particularly preferably 85 nm or less, and especially preferably 80 nm or less.

Here, the pore distribution width refers to a width of a peak at which the log differential pore volume (see, for example, FIG. 2) is 0.1 ml/g or more.

In the case where there are plurality of peaks in the range of 10 nm or more and 200 nm or less in the pore distribution, the phrase "a pore distribution width is 30 nm or more and 170 nm or less" as used herein means that where, in a graph showing a pore distribution with pore diameter as abscissa against log differential pore volume as ordinate (see, for example, FIG. 2), a point intersecting with a log differential pore volume of 0.1 mL/g for the first time as viewed from a side where the pore diameter is smaller (a point intersecting while ascending) is defined as a minimum diameter and a point intersecting with the log differential pore volume of 0.1 mL/g again (a point intersecting while descending) is defined as a maximum diameter, the difference between the maximum diameter and the minimum diameter is 30 nm or more and 170 nm or less.

3. Pore Volume of Interparticle Spaces of Primary Particles

The zirconia powder has a pore volume of 0.2 ml/g or more and less than 0.5 ml/g in a range of 10 nm or more and 200 nm or less in a pore distribution based on a mercury intrusion method. The total pore volume is preferably 0.22 ml/g or more, more preferably 0.25 ml/g or more, still more preferably 0.3 ml/g or more, particularly preferably 0.35 ml/g or more, and especially preferably 0.4 ml/g or more. The total pore volume is preferably 0.48 ml/g or less, more preferably 0.46 ml/g or less, and particularly preferably 0.44 ml/g or less.

It is unclear why the ratio of the monoclinic crystal phase contained in the crystal phase of the zirconia sintered body is easily adjusted to 0.2% or more and 5% or less by controlling the peak top diameter, the pore volume, and the pore distribution width to within the above numerical ranges, but the present inventor infers that controlling powder properties (pore volume and pore distribution width) makes low-temperature sintering possible. That is, under sintering conditions at a high temperature exceeding 1350° C., when the amount of the stabilizer is reduced in order to obtain high toughness, the amount of phase transition from the tetragonal crystal phase to the monoclinic crystal phase during temperature drop for sintering becomes excessively large, so that large cracks are generated in the sintered body due to volume change. So, by controlling the powder properties (pore volume and pore distribution width), it becomes possible to perform sintering at a low temperature and the prescribed monoclinic crystal phase ratio (0.2% or more and 5% or less) can be achieved.

It is apparent from comparison between Examples and Comparative Examples that when the peak top diameter, the pore volume, and the pore distribution width are controlled to within the above numerical ranges, the ratio of the monoclinic crystal phase contained in the crystal phase of a zirconia sintered body is easily adjusted to 0.2% or more and 5% or less.

The peak top diameter, the pore distribution width, and the pore volume refer to values obtained by the methods described in Examples.

Since the zirconia powder described above readily makes the ratio of the monoclinic crystal phase contained in the crystal phase of the zirconia sintered body be 0.2% or more and 5% or less, crack generation in a resulting zirconia sintered body is remarkably suppressed whereas microcracks can be easily formed and a toughness improving effect due to a microcrack strengthening mechanism is obtained.

The zirconia powder does not need mixing of two types of powders, and also sintering by HIP is not essential.

As described above, according to the zirconia powder described above, it is possible to easily obtain a zirconia sintered body having high toughness.

<Particle Diameter $D_{50}$>

The particle diameter $D_{50}$ of the zirconia powder is preferably 0.1 μm or more and 0.7 μm or less. The particle diameter $D_{50}$ is preferably 0.12 μm or more, more preferably 0.14 μm or more, still more preferably 0.16 μm or more, and particularly preferably 0.2 μm or more. The particle diameter $D_{50}$ is preferably 0.62 μm or less, more preferably 0.55 μm or less, still more preferably 0.48 μm or less, particularly preferably 0.4 μm or less, especially preferably 0.3 μm or less, and extremely preferably less than 0.3 μm. The particle diameter $D_{50}$ refers to a value obtained by the method described in Examples.

When the particle diameter $D_{50}$ is measured, not only secondary particles but also unaggregated primary particles may be contained, but the amount of unaggregated primary particles that may be contained in the zirconia powder is very small. Therefore, the particle diameter $D_{50}$ may be regarded as representing the particle diameter $D_{50}$ of the secondary particles, that is, the average particle diameter of the secondary particles.

When the particle diameter $D_{50}$ is 0.1 μm or more and 0.7 μm or less, the zirconia powder is superior in sinterability.

<Specific Surface Area>

The specific surface area of the zirconia powder is preferably 10 m²/g or more and 50 m²/g or less. The specific surface area is preferably 20 m²/g or more, more preferably 22 m²/g or more, still more preferably 24 m²/g or more, particularly preferably 26 m²/g or more, and especially preferably 28 m²/g or more. The specific surface area is preferably 40 m²/g or less, more preferably 38 m²/g or less, still more preferably 36 m²/g or less, particularly preferably 34 m²/g or less, and especially preferably 32 m²/g or less. The specific surface area refers to a value obtained by the method described in Examples.

When the specific surface area is 10 m²/g or more and 50 m²/g or less, the zirconia powder is superior in sinterability.

The zirconia powder may contain an additive. In the present description, the additive refers to an agent added as a mixture to zirconia particles. Examples of the additive include a sintering aid and a colorant. The additives include one that functions only as a sintering aid, one that functions only as a colorant, and one that functions as a sintering aid and also functions as a colorant. Hereinafter, the sintering aid and the colorant will be described.

The zirconia powder may contain 0.005 mass % or more and 2 mass % or less of alumina and one or more metal oxides selected from the group consisting of metal oxides having a Tammann temperature of 1200° C. or lower. Examples of the metal oxide having a Tammann temperature of 1200° C. or lower include oxides of iron, germanium, cobalt, chromium, and zinc. The content of the alumina and one or more metal oxides selected from the group consisting of metal oxides having a Tammann temperature of 1200° C. or lower is more preferably 0.01 mass % or more, still more preferably 0.03 mass % or more, particularly preferably 0.05 mass % or more, and especially preferably 0.07 mass % or more. The content of the alumina and one or more metal oxides selected from the group consisting of metal oxides having a Tammann temperature of 1200° C. or lower is more preferably 1.5 mass % or less, still more preferably 1.2 mass % or less, particularly preferably 0.5 mass % or less, and especially preferably 0.25 mass % or less. When alumina and one or more metal oxides selected from the group consisting of metal oxides having a Tammann temperature of 1200° C. or lower are contained within the above numerical range, the metal oxides function as a sintering aid, and therefore the zirconia powder is superior in low-temperature sinterability.

Since the zirconia powder contains alumina, a reduction in the toughness of a zirconia sintered body is likely to be suppressed. Furthermore, the translucency of the zirconia sintered body can be improved by adjusting the content of alumina.

The form of alumina is not particularly limited, and an alumina powder is preferable from the viewpoint of ensuring handling properties during the preparation of the zirconia powder (when mixing and dispersing in zirconia particles) and reducing residual impurities.

When the form of alumina is a powder, the average particle diameter of primary particles of alumina is not particularly limited, and the average particle diameter is, for example, 0.02 to 0.4 μm, preferably 0.05 to 0.3 μm, and more preferably 0.07 to 0.2 μm.

The zirconia powder may contain a sintering aid, but may not contain a sintering aid. Specifically, the content of the alumina and one or more metal oxides selected from the group consisting of metal oxides having a Tammann temperature of 1200° C. or lower in the zirconia powder may be less than 0.005 mass %. The phrase that the content of alumina and one or more metal oxides selected from the group consisting of metal oxides having a Tammann temperature of 1200° C. or lower is less than 0.005 mass % means that no sintering aid is contained.

The zirconia powder may comprise sinterable ceramics, a thermosetting resin, or the like in addition to alumina and the metal oxide having a Tammann temperature of 1200° C. or lower for the purpose of improving such characteristics as strength.

The zirconia powder may contain one or more elements selected from the group consisting of Fe, V, Er, Mn, Co, Tb, Zn, Cu, and Ti. When the zirconia powder contains one or more elements selected from the group consisting of Fe, V, Er, Mn, Co, Tb, Zn, Cu, and Ti as a coloring element, a zirconia sintered body obtained by sintering the zirconia powder can be suitably colored.

The form of the coloring element is not particularly limited, and the coloring element can be added in the form of an oxide or chloride or the like. Examples of the colorant containing the coloring element include $Fe_2O_3$, $V_2O_5$, $Er_2O_3$, $MnO_2$, $CoO$, $Tb_4O_7$, $ZnO$, $CuO$, and $TiO_2$. The colorant is preferably added as a mixture to the zirconia powder.

When $Fe_2O_3$ is contained as the colorant, the content of the colorant is preferably 0.005 mass % or more and 1 mass % or less, and more preferably 0.05 mass % or more and 0.5 mass % or less where the entire amount of the zirconia powder is 100 mass %. When the content of the colorant is 0.005 mass % or more, intended coloring is easily obtained. That is, the color tone can be easily adjusted.

When $V_2O_5$ is contained as the colorant, the content thereof is preferably 0.005 mass % or more and 0.5 mass % or less, and more preferably 0.01 mass % or more and 0.1 mass % or less where the entire amount of the zirconia powder is 100 mass %. When the content of the colorant is 0.005 mass % or more, intended coloring is easily obtained. That is, the color tone can be easily adjusted.

When $Er_2O_3$ is contained as the colorant, the content of the colorant is preferably 0.005 mass % or more and 10 mass % or less, and more preferably 0.1 mass % or more and 5 mass % or less where the entire amount of the zirconia powder is 100 mass %. When the content of the colorant is 0.005 mass % or more, intended coloring is easily obtained. That is, the color tone can be easily adjusted.

When $MnO_2$ is contained as the colorant, the content thereof is preferably 0.005 mass % or more and 2 mass % or less, and more preferably 0.1 mass % or more and 1.1 mass % or less where the entire amount of the zirconia powder is 100 mass %. When the content of the colorant is 0.005 mass % or more, intended coloring is easily obtained. That is, the color tone can be easily adjusted.

When $CoO$ is contained as the colorant, the content of the colorant is preferably 0.005 mass % or more and 2 mass % or less, and more preferably 0.01 mass % or more and 1.5 mass % or less where the entire amount of the zirconia powder is 100 mass %. When the content of the colorant is 0.005 mass % or more, intended coloring is easily obtained. That is, the color tone can be easily adjusted.

When $Tb_4O_7$ is contained as the colorant, the content of the colorant is preferably 0.005 mass % or more and 5 mass % or less, and more preferably 0.1 mass % or more and 3 mass % or less where the entire amount of the zirconia powder is 100 mass %. When the content of the colorant is 0.005 mass % or more, intended coloring is easily obtained. That is, the color tone can be easily adjusted.

When ZnO is contained as the colorant, the content of the colorant is preferably 0.005 mass % or more and 1 mass % or less, and more preferably 0.1 mass % or more and 0.5 mass % or less where the entire amount of the zirconia powder is 100 mass %. When the content of the colorant is 0.005 mass % or more, intended coloring is easily obtained. That is, the color tone can be easily adjusted.

When CuO is contained as the colorant, the content of the colorant is preferably 0.005 mass % or more and 1 mass % or less, and more preferably 0.05 mass % or more and 0.6 mass % or less where the entire amount of the zirconia powder is 100 mass %. When the content of the colorant is 0.005 mass % or more, intended coloring is easily obtained. That is, the color tone can be easily adjusted.

When $TiO_2$ is contained as the colorant, the content of the colorant is preferably 0.005 mass % or more and 2 mass % or less, more preferably 0.01 mass % or more and 1 mass % or less, and still more preferably 0.1 mass % or more and 0.3 mass % or less where the entire amount of the zirconia powder is 100 mass %. When the content of the colorant is 0.005 mass % or more, intended coloring is easily obtained. That is, the color tone can be easily adjusted.

<Relative Molding Density>

The zirconia powder preferably has a relative molding density of 45 to 50% when molded at a molding pressure of 2 t/cm². Here, the relative molding density is a value calculated by the following formula.

$$\text{Relative molding density (\%)} = (\text{molding density/theoretical sintered density}) \times 100 \qquad (4)$$

Here, the theoretical sintered density (denoted by $\rho_0$) is a value calculated by the formula (2-1) described in the section of "Method for measuring relative sintered density of zirconia sintered body" below. The upper limit of the relative molding density is preferably 45.5% or more, and more preferably 46% or more. The lower limit is preferably 49.5% or less, more preferably 49% or less, still more preferably 48.5% or less, and particularly preferably 48% or less.

The zirconia powder according to the present embodiment has been described above.

[Method for Producing Zirconia Powder]

Hereinafter, an example of a method for producing a zirconia powder will be described. However, the method for producing a zirconia powder is not limited to the following examples.

The method for producing a zirconia powder according to the present embodiment comprises:

step 1 of separately heating a zirconium salt solution and a sulfating agent solution to 95° C. or higher and 100° C. or lower;

step 2 of obtaining a basic zirconium sulfate-containing reaction liquid as a mixed liquid by bringing the zirconium salt solution after the heating and the sulfating agent solution after the heating into contact with each other in such a manner that the concentration of the mixed liquid does not change from the start to the end of the contact;

step 3 of aging the basic zirconium sulfate-containing reaction liquid obtained in step 2 at 95° C. or higher for 3 hours or more;

step 4 of adding a stabilizer to the basic zirconium sulfate-containing reaction liquid after the aging obtained in step 3;

step 5 of obtaining a zirconium-containing hydroxide by adding an alkali to the basic zirconium sulfate-containing reaction liquid obtained in step 4; and step 6 of obtaining a zirconia powder by heat-treating the zirconium-containing hydroxide obtained in step 5, in which in step 2, the $SO_4^{2-}/ZrO_2$ weight ratio in the mixed liquid is maintained in a range of 0.3 to 0.8 and the temperature of the mixed liquid is maintained at 95° C. or higher from the start to the end of the contact.

Hereinafter, each of the steps will be described in detail.

<Step 1>

In step 1, a zirconium salt solution and a sulfating agent solution as starting materials are separately heated to 95° C. or higher and 100° C. or lower.

The zirconium salt to be used for preparing the zirconium salt solution may be any one that supplies zirconium ions, and for example, zirconium oxynitrate, zirconium oxychloride, and zirconium nitrate can be used. One or two or more thereof may be used. Among these, zirconium oxychloride is preferable in terms of its high productivity on an industrial scale.

The solvent to be used for forming the zirconium salt solution may be chosen according to the type, etc. of the zirconium salt. Usually, water (pure water or ion-exchanged water, the same applies hereinafter) is preferable.

The concentration of the zirconium salt solution is not particularly limited, and in general, the zirconium salt is preferably contained in an amount of 5 to 250 g, more preferably 20 to 150 g, in terms of zirconium oxide ($ZrO_2$) based on 1000 g of the solvent.

The sulfating agent may be any one that reacts with zirconium ions to produce a sulfate (that is, a sulfating reagent), and examples thereof include sodium sulfate, potassium sulfate, ammonium sulfate, potassium hydrogen sulfate, sodium hydrogen sulfate, potassium disulfate, sodium disulfate, and sulfur trioxide. The sulfating agent may be in any form such as a powder or solution form, and a solution (especially, an aqueous solution) is preferable. As the solvent, the same solvent as the solvent to be used for preparing the zirconium salt solution can be used.

The acid concentration of the zirconium salt solution is preferably set to 0.1 to 2.0 N. By setting the acid concentration within the above range, the aggregation state of the particles constituting the zirconia powder can be controlled to a suitable state. The acid concentration can be adjusted by using, for example, hydrochloric acid, nitric acid, sodium hydroxide, or the like.

The concentration of the sulfating agent (the sulfating agent solution) is not particularly limited, and in general, it is preferable that the amount of the sulfating agent is 5 to 250 g, particularly 20 to 150 g, based on 1000 g of the solvent.

The containers for preparing the zirconium salt solution and the sulfating agent solution are not particularly limited with respect to their materials as long as the containers each have a capacity large enough for sufficiently stirring the zirconium salt solution and the sulfating agent solution. However, the containers preferably have equipment capable of appropriately heating such that the temperature of each solution does not fall below 95° C.

The heating temperature of the zirconium salt solution and the sulfating agent solution is just required to be 95° C. or higher and 100° C. or lower, and is preferably 97° C. or higher. When step 2 is performed while the temperature of the zirconium salt solution and the sulfating agent solution is kept lower than 95° C., the zirconium salt solution and the sulfating agent do not sufficiently react with each other, resulting in a lowered yield.

<Step 2>

In step 2, the heated zirconium salt solution and the heated sulfating agent solution are brought into contact with each other such that the concentration of a mixed liquid does not change from the start to the end of the contact, thereby affording a basic zirconium sulfate-containing reaction solution as a mixed liquid. Here, from the start to the end of the contact, the weight ratio $SO_4^{2-}/ZrO_2$ in the mixed liquid is maintained in a range of 0.3 to 0.8, and the temperature of the mixed liquid is maintained at 95° C. or higher.

Hereinafter, step 2 will be described with reference to drawings.

FIG. 1 is a schematic view for explaining a method for producing a zirconia powder according to the present embodiment. As shown in FIG. 1, the container 10 is connected to one end (left side in FIG. 1) above the T-shaped tube 20 via a valve 12. The container 30 is connected to the other end (the right side in FIG. 1) above the T-shaped tube 20 via a valve 32. In the container 10 is stored a zirconium solution heated to 95° C. or higher and 100° C. or lower. In the container 30 is stored a sulfating agent solution heated to 95° C. or higher and 100° C. or lower.

In step 2, the valve 12 is opened and the valve 32 is opened to bring the zirconium solution into contact with the sulfating agent solution. The mixed liquid (basic zirconium sulfate-containing reaction liquid) obtained by the contact immediately flows into an aging container 40 from the lower side of the T-shaped tube 20. In step 2, by such a method, the concentration of the reaction liquid (the concentration of the reaction liquid in the T-shaped tube 20) is prevented from changing from the start to the end of the contact of the zirconium solution with the sulfating agent solution. In step 2, since the concentration change of $SO_4^{2-}/ZrO_2$ from the start to the end of contact is suppressed, a uniform reactant is obtained. By adopting such a step (step 2), the peak top diameter, the pore volume, and the pore distribution width of primary particles can be controlled. That is, the size of the pores derived from the interparticle spaces of the primary particles in the secondary particles can be reduced, the distribution of the pores can be sharpened, and the volume of pores derived from the interparticle spaces of the primary particles can also be reduced.

The weight ratio $SO_4^{2-}/ZrO_2$ in the mixed liquid in step 2 is preferably within a range of 0.3 to 0.8, more preferably 0.4 to 0.7, and still more preferably 0.45 to 0.65. When the weight ratio $SO_4^{2-}/ZrO_2$ in the mixed liquid is 0.3 or more, the yield of basic zirconium sulfate as a reaction product can be increased. In addition, by adjusting the $SO_4^{2-}/ZrO_2$ weight ratio in the mixed liquid to 0.8 or less, it is possible to suppress the formation of a soluble salt of zirconium sulfate and to suppress a decrease in the yield of basic zirconium sulfate.

In step 2, in order to maintain the temperature of the mixed liquid at 95° C. or higher, it is preferable to install a heater in a tube (for example, T-shaped tube 20) or the like for supplying each solution.

Hereinafter, an example of step 2 will be specifically described.

When 213 g of a 25 mass % aqueous sodium sulfate solution and 450 g of an aqueous zirconium oxychloride solution with a concentration of 16 mass % in terms of $ZrO_2$ are brought into contact with each other using a T-shaped tube having a tube diameter L1 of 10 mm at one upper end (the left side in FIG. 1), a tube diameter L2 of 10 mm at the other upper end (the right side in FIG. 1), and a tube diameter L3 of 15 mm at the lower end as the T-shaped tube 20, the time (contact time) from the start of contact to the end of contact (until the aqueous zirconium chloride solution in the container 10 and the sulfating agent solution in the container 30 disappear) is preferably 30 seconds to 300 seconds, more preferably 60 seconds to 200 seconds, and still more preferably 90 seconds to 150 seconds.

<Step 3>

In step 3, the basic zirconium sulfate-containing reaction liquid obtained in step 2 is aged at 95° C. or higher for 3 hours or more. In step 3, for example, the basic zirconium sulfate-containing reaction liquid flowing into the aging container 40 is aged at 95° C. or higher for 3 hours or more while being stirred with a stirrer 42. The upper limit of the aging time is not particularly limited, and is, for example, 7 hours or less. The temperature (aging temperature) of the mixed liquid (the basic zirconium sulfate-containing reaction liquid) in step 3 is preferably 95° C. or higher, and more preferably 97° C. or higher and 100° C. or lower. By setting the aging temperature to 95° C. or higher and the aging time to 3 hours or more, basic zirconium sulfate is sufficiently produced, and the yield can be increased.

The mixed liquid contains basic zirconium sulfate as a main component, and is a basic zirconium sulfate slurry.

<Step 4>

In step 4, a stabilizer is added to the basic zirconium sulfate-containing reaction liquid after aging obtained in step 3.

<Step 5>

In step 5, an alkali is added to the basic zirconium sulfate-containing reaction solution obtained in step 4 to perform a neutralization reaction. Neutralization produces a zirconium-containing hydroxide.

The alkali is not limited, and examples thereof include sodium hydroxide, sodium carbonate, ammonia, and hydrazine ammonium bicarbonate. The alkali is not particularly limited in concentration, and one diluted with water and having a concentration of 5 to 30% is usually used.

While as a method for adding the alkali there are two methods: (1) adding an alkali solution to the basic zirconium sulfate-containing reaction liquid and (2) adding the basic zirconium sulfate-containing reaction liquid to an alkali solution, the method is not particularly limited and either method may be used.

After the neutralization, the slurry is filtered to afford a zirconium-containing hydroxide. The zirconium-containing hydroxide is preferably washed with pure water or the like to remove impurities, as necessary. After washing with water, drying or the like may be performed, as necessary.

<Step 6>

In step 6, the zirconium-containing hydroxide obtained in step 5 is subjected to heat treatment (firing) to oxidize the zirconium-containing hydroxide, thereby affording a zirconia powder.

The heat treatment temperature (firing temperature) and the heat treatment time (firing time) of the zirconium-containing hydroxide are not particularly limited, and the heat treatment is usually performed at about 600 to 1050° C. for 1 hour to 10 hours. The firing temperature is more preferably 650° C. or higher and 1000° C. or lower, and still more preferably 700° C. or higher and 950° C. or lower. The firing temperature is more preferably 2 hours to 6 hours, and still more preferably 2 hours to 4 hours. By setting the heat treatment temperature to 600° C. or higher and 1000° C. or lower, the specific surface area of the resulting zirconia powder can be set to a suitable range. By setting the heat treatment temperature to 600° C. or higher and 1050° C. or lower, the pore distribution of the resulting zirconia powder can be set to a suitable range. The heat treatment atmosphere is not particularly limited, and may be usually in the air or an oxidizing atmosphere.

<Step 7>

After step 6, the resulting zirconia powder may be pulverized to form a slurry, as necessary. In this case, a binder may be added in order to improve moldability. When a slurry is not intended to form (is not intended to pulverize), the binder and the zirconia powder may be uniformly mixed with a kneading machine.

The binder is preferably an organic binder. The organic binder is likely to be removed from the molded body in a heating furnace in an oxidizing atmosphere, and a degreased body can be obtained, whereby finally, impurities are less likely to remain in the sintered body.

Examples of the organic binder include those that are soluble in alcohol, or those that are soluble in mixed liquids of two or more selected from the group consisting of alcohols, water, aliphatic ketones, and aromatic hydrocarbons. Examples of the organic binder include at least one selected from the group consisting of polyethylene glycol, glycol fatty acid ester, glycerol fatty acid ester, polyvinyl butyral, polyvinyl methyl ether, polyvinyl ethyl ether, and vinyl propionate. The organic binder may further contain one or more thermoplastic resins that are insoluble in alcohols, or the mixed liquids.

After the addition of the organic binder, a target zirconia powder can be obtained by performing such treatment as drying or pulverization by applying a publicly-known method.

The particle diameter $D_{50}$ of the zirconia powder can be controlled by the pulverization of step 7. For example, pulverization is performed according to the state of the zirconia powder obtained in step 5, and the particle diameter $D_{50}$ of the zirconia powder can thereby be controlled within a range of 0.1 µm or more and 0.7 µm or less.

In the case of adding a sintering aid, a colorant, or the like, a zirconia powder containing the sintering aid, the colorant, or the like can be obtained by adding and mixing them after step 6. As a more detailed method of mixing, it is preferable to disperse the mixture in pure water or the like to form a slurry, followed by wet-mixing.

In the case where step 7 is performed, a sintering aid, a colorant, or the like may be added when step 7 is performed.

The zirconia powder according to the present embodiment has been described above.

[Method for Producing Zirconia Sintered Body]

Hereinafter, an example of a method for producing a zirconia sintered body will be described. However, the method for producing a zirconia sintered body of the present invention is not limited to the following examples.

The method for producing a zirconia sintered body according to the present embodiment comprises: step X of molding the zirconia powder to obtain a molded body; and step Y of sintering the molded body at 1200° C. or higher and 1350° C. or lower and for 1 hour or more and 5 hours or less after the step X.

In the method for producing a zirconia sintered body according to the present embodiment, first, a zirconia powder is prepared. As the zirconia powder, one described in the section of [Zirconia powder] can be used.

Next, the zirconia powder is molded to afford a molded body (step X). For the molding, a commercially available molding machine and a cold isostatic pressing method (CIP) can be employed. The zirconia powder may be temporarily molded by a molding machine and then main-molded by press molding. The press molding may usually be in a range of 0.1 t to 3 t/cm². The pressure is preferably 0.5 t to 2.5 t/cm², more preferably 0.8 t to 2.2 t/cm², and still more preferably 1 t to 2 t/cm².

Next, the molded body is sintered at 1200° C. or higher and 1350° C. or lower for 1 hour or more and 5 hours or less (step Y). In the present embodiment, by containing a relatively small amount of the stabilizer and setting the sintering temperature to a low temperature of 1200 to 1350° C., the ratio of the monoclinic crystal phase contained in the crystal phase of a resulting zirconia sintered body can be controlled to within the range of 0.2% or more and 5% or less. When sintering is performed at a high temperature exceeding 1350° C., the monoclinic crystal phase ratio may be high (more than 5%). As a result, a sintered body having high strength and high toughness can be obtained. The sintering temperature is more preferably 1200° C. or higher and 1300° C. or lower, and 1200° C. or higher and 1250° C. or lower. The holding time during sintering is also not particularly limited, and is, for example, preferably about 1 to 5 hours, and more preferably 1 hour to 3 hours. The sintering atmosphere may be the air or an oxidizing atmosphere. Sintering may be performed under normal pressure, and pressurization is not particularly necessary.

The method for producing the stabilized zirconia sintered body according to the present embodiment has been described above.

According to the zirconia powder and the method for producing a zirconia sintered body of the present embodiment, since a sintered body having high strength and high toughness can be obtained even by sintering at a low temperature of 1200° C. to 1350° C., various publicly-known molding methods such as press molding, injection molding, cast molding, and sheet molding can be widely used. Moreover, since the zirconia powder of the present embodiment is easily mass-produced, the zirconia powder is superior also in cost competitiveness and can be suitably used for various applications.

[Zirconia Sintered Body]

In the following, an example of the zirconia sintered body according to the present embodiment is described. However, the zirconia sintered body of the present invention is not limited to the following example.

In the zirconia sintered body according to the present embodiment, a ratio of the monoclinic crystal phase contained in crystal phase is 0.2% or more and 5% or less, a length of a crack generated in the sintered body when a load is set to 50 kgf in toughness measurement by an IF method is 1 µm or more and 90 µm or less, and a three-point bending strength is 80 kg/mm² or more and 150 kg/mm² or more.

The ratio of the monoclinic crystal phase contained in the crystal phase of the zirconia sintered body is 0.2% or more and 5% or less. The monoclinic crystal phase ratio is preferably 0.3% or more, more preferably 0.4% or more, still more preferably 0.5% or more, particularly preferably 0.6% or more, and especially preferably 0.7% or more. The monoclinic crystal phase ratio is preferably 4% or less, more preferably 3.5% or less, still more preferably 3% or less, particularly preferably 2.5% or less, and especially preferably 2% or less.

Since the monoclinic crystal phase ratio is 0.2% or more and 5% or less, it is possible to develop a microcrack strengthening mechanism. The monoclinic crystal phase ratio can be controlled by, for example, the content of the stabilizer or the sintering temperature.

The monoclinic crystal phase ratio is determined by the method described in Examples.

In the zirconia sintered body, the length of a crack generated in the sintered body when a load is set to 50 kgf in toughness measurement by an IF method is 1 μm or more and 90 μm or less. The length of the crack is preferably 3 μm or more, more preferably 10 μm or more, still more preferably 12 μm or more, particularly preferably 15 μm or more, and especially preferably 20 μm or more. The length of the crack is preferably 80 μm or less, more preferably 60 μm or less, still more preferably 55 μm or less, particularly preferably 50 μm or less, and especially preferably 40 μm or less. The crack length can be controlled by the monoclinic crystal phase ratio. Since the crack length is 1 μm or more and 90 μm or less, the zirconia sintered body is superior in toughness.

The crack length is determined by the method described in Examples.

The zirconia sintered body preferably has a toughness value of 10 MPa·m$^{0.5}$ or more and 40 MPa·m$^{0.5}$ or less when a load is 50 kgf in toughness measurement by an IF method. The toughness value is preferably 13 MPa·m$^{0.5}$ or more, more preferably 15 MPa·m$^{0.5}$ or more, still more preferably 17 MPa·m$^{0.5}$ or more, particularly preferably 20 MPa·m$^{0.5}$ or more, and especially preferably 25 MPa·m$^{0.5}$ or more. The toughness value is preferably MPa·m$^{0.5}$ or less, more preferably 36 MPa·m$^{0.5}$ or less, still more preferably 33 MPa·m$^{0.5}$ or less, particularly preferably 30 MPa·m$^{0.5}$ or less, and especially preferably 28 MPa·m$^{0.5}$ or less. When the toughness value is 10 MPa·m$^{0.5}$ or more and 40 MPa·m$^{0.5}$ or less, it can be said that the zirconia sintered body has sufficiently high toughness. The toughness value can be controlled by the monoclinic crystal phase ratio.

The toughness value is determined by the method described in Examples.

The zirconia sintered body has a three-point bending strength of 80 kg/mm$^2$ or more and 150 kg/mm$^2$ or less. The three-point bending strength is preferably 90 kg/mm$^2$ or more, more preferably 95 kg/mm$^2$ or more, still more preferably 100 kg/mm$^2$ or more, and particularly preferably 110 kg/mm$^2$ or more. The three-point bending strength is preferably 140 kg/mm$^2$ or less, more preferably 135 kg/mm$^2$ or less, still more preferably 130 kg/mm$^2$ or less, particularly preferably 125 kg/mm$^2$ or less, and especially preferably 120 kg/mm$^2$ or less.

Since the three-point bending strength is 80 kg/mm$^2$ or more and 150 kg/mm$^2$ or less, the zirconia sintered body is superior in strength. The three-point bending strength can be controlled by, for example, the monoclinic crystal phase ratio. The three-point bending strength can be controlled by, for example, a relative sintered density. Specifically, by making the relative sintered density high, high strength (80 kg/mm$^2$ or more) can be achieved. The three-point bending strength is measured by the method described in Examples.

<Relative Sintered Density>

The relative sintered density of the zirconia sintered body is preferably 98.5% or more, more preferably 99.0% or more, still more preferably 99.1% or more, particularly preferably 99.2% or more, especially preferably 99.3% or more, extremely preferably 99.4% or more, and more extremely preferably 99.5% or more. When the relative sintered density is 98.5% or more, the zirconia sintered body has higher strength.

<Method for Measuring Relative Sintered Density of Zirconia Sintered Body>

The relative sintered density refers to a relative sintered density represented by the following formula (1):

$$\text{relative sintered density }(\%) = (\text{sintered density/theoretical sintered density}) \times 100 \qquad (1)$$

Here, the theoretical sintered density ($\rho_0$) is a value calculated by the following formula (2-1).

$$\rho 0 = 100/[(Y/3.987) + (100-Y)/\rho z] \qquad (2\text{-}1)$$

However, $\rho z$ is a value calculated by the following formula (2-2).

$$\rho z = [124.25(100-X) + [\text{molecular weight of stabilizer}] \times X]/[150.5(100+X)A^2 C] \qquad (2\text{-}2)$$

Here, as the molecular weight of the stabilizer is used 225.81 when the stabilizer is $Y_2O_3$, 382.52 when the stabilizer is $Er_2O_3$, and 394.11 when the stabilizer is $Yb_2O_3$.

X and Y are a stabilizer concentration (mol %) and an alumina concentration (wt %), respectively. A and C are respectively values calculated by the following formulae (2-3) and (2-4).

$$A = 0.5080 + 0.06980X/(100+X) \qquad (2\text{-}3)$$

$$C = 0.5195 - 0.06180X/(100+X) \qquad (2\text{-}4)$$

In the formula (1), the theoretical sintered density varies depending on the composition of the powder. For example, the theoretical sintered density of yttria-containing zirconia is 6.117 g/cm$^3$ when the yttria content is 2 mol %, 6.098 g/cm$^3$ when the yttria content is 3 mol %, and 6.051 g/cm$^3$ when the yttria content is 5.5 mol % (in the case of $Al_2O_3$=0).

When the stabilizer is CaO, $\rho z$ is a value calculated by the following formula (3).

$$\rho z = -0.0400(\text{molar concentration of CaO}) + 6.1700 \qquad (3)$$

The theoretical sintered density (denoted by $\mu 1$) in the case of containing a colorant is $$\rho 1 = 100/[(Z/V) + (100-Z)/\rho 0] \qquad (2\text{-}5).$$

Z is a concentration (% by weight) of the colorant, and V is a theoretical density (g/cm$^3$) of the colorant.

The theoretical density of the colorant is 5.24 g/cm$^3$ for $Fe_2O_3$, 5.61 g/cm$^3$ for ZnO, 5.03 g/cm$^3$ for $MnO_2$, 6.10 g/cm$^3$ for CoO, 4.23 g/cm$^3$ for $TiO_2$, 7.80 g/cm$^3$ for $Tb_4O_7$, and 6.31 g/cm$^3$ for CuO.

The sintered density is measured by the Archimedes method.

It is preferable for the zirconia sintered body that a monoclinic crystal phase ratio of a surface after exposed to a hydrothermal condition at 134° C. for 75 hours is 32% or less. The monoclinic crystal phase ratio is preferably 31.5% or less, more preferably 30% or less, still more preferably 25% or less, particularly preferably 23% or less, and especially preferably 20% or less. The monoclinic crystal phase ratio of a surface after exposure to a hydrothermal condition at 134° C. for 75 hours can be achieved, for example, by using a specific stabilizer (for example, CaO). When the monoclinic crystal phase ratio is 32% or less, it can be said that the zirconia sintered body is superior in resistance to hydrothermal degradation.

The monoclinic crystal phase ratio is measured by the method described in Examples.

Preferably, the zirconia sintered body comprises a stabilizer and the stabilizer is one or more compounds selected from the group consisting of CaO, $Y_2O_3$, $Er_2O_3$, and $Yb_2O_3$. The stabilizer varies depending on the application, and CaO, $Y_2O_3$, and $Yb_2O_3$ are preferable from the viewpoint of cost, coloring, etc. The stabilizer is preferably CaO from the viewpoint of resistance to hydrothermal degradation.

When the stabilizer is only $Y_2O_3$, the content of the $Y_2O_3$ based on the entire amount of the zirconia powder is preferably 1.4 mol % or more and less than 2.0 mol %. The content of the $Y_2O_3$ is preferably 1.45 mol % or more, more preferably 1.5 mol % or more, still more preferably 1.55 mol % or more, particularly preferably 1.57 mol % or more, and especially preferably 1.6 mol % or more. The content of the $Y_2O_3$ is preferably 1.9 mol % or less, more preferably less than 1.8 mol %, still more preferably 1.75 mol % or less, particularly preferably 1.7 mol % or less, and especially preferably 1.65 mol % or less.

When the $Y_2O_3$ is contained at a content within a range of 1.4 mol % or more and less than 2.0 mol %, the ratio of the monoclinic crystal phase contained in the crystal phase of the zirconia sintered body is easily adjusted to 0.2% or more and 5% or less.

When the stabilizer is only $Er_2O_3$, the content of the $Er_2O_3$ based on the entire amount of the zirconia powder is preferably 1.4 mol % or more and 1.8 mol % or less. The content of the $Er_2O_3$ is preferably 1.45 mol % or more, more preferably 1.5 mol % or more, still more preferably 1.55 mol % or more, particularly preferably 1.57 mol % or more, and especially preferably 1.6 mol % or more. The content of the $Er_2O_3$ is preferably 1.9 mol % or less, more preferably less than 1.8 mol %, still more preferably 1.75 mol % or less, particularly preferably 1.7 mol % or less, and especially preferably 1.65 mol % or less.

When the $Er_2O_3$ is contained at a content within a range of 1.4 mol % or more and 1.8 mol % or less, the ratio of the monoclinic crystal phase contained in the crystal phase of the zirconia sintered body is easily adjusted to 0.2% or more and 5% or less.

When the stabilizer is only $Yb_2O_3$, the content of the $Yb_2O_3$ based on the entire amount of the zirconia powder is preferably 1.4 mol % or more and 1.8 mol % or less. The content of the $Yb_2O_3$ is preferably 1.75 mol % or less, more preferably less than 1.7 mol %, still more preferably 1.65 mol % or less, and particularly preferably 1.63 mol % or less.

When the $Yb_2O_3$ is contained at a content within a range of 1.4 mol % or more and 1.8 mol % or less, the ratio of the monoclinic crystal phase contained in the crystal phase of the zirconia sintered body is easily adjusted to 0.2% or more and 5% or less.

When the stabilizer is only CaO, the content of the CaO based on the entire amount of the zirconia powder is preferably 3.5 mol % or more and 4.5 mol % or less. The content of the CaO is preferably 3.6 mol % or more, more preferably 3.7 mol % or more, still more preferably 3.8 mol % or more, particularly preferably 3.9 mol % or more, and especially preferably 3.95 mol % or more. The content of the CaO is preferably 4.4 mol % or less, more preferably 4.3 mol % less, still more preferably 4.2 mol % or less, particularly preferably 4.1 mol % or less, and especially preferably 4.05 mol % or less. When the CaO is contained at a content within a range of 3.5 mol % or more and 4.5 mol % or less, the ratio of the monoclinic crystal phase contained in the crystal phase of the zirconia sintered body is easily adjusted to 0.2% or more and 5% or less.

The zirconia sintered body may contain 0.005 mass % or more and 2 mass % or less of alumina and one or more metal oxides selected from the group consisting of metal oxides having a Tammann temperature of 1200° C. or lower. Examples of the metal oxide having a Tammann temperature of 1200° C. or lower include oxides of iron, germanium, cobalt, chromium, and zinc. The content of the alumina and one or more metal oxides selected from the group consisting of metal oxides having a Tammann temperature of 1200° C. or lower is more preferably 0.01 mass % or more, still more preferably 0.03 mass % or more, particularly preferably 0.05 mass % or more, and especially preferably 0.07 mass % or more. The content of the alumina and one or more metal oxides selected from the group consisting of metal oxides having a Tammann temperature of 1200° C. or lower is more preferably 1.5 mass % or less, still more preferably 1.2 mass % or less, particularly preferably 0.5 mass % or less, and especially preferably 0.25 mass % or less. When alumina and one or more metal oxides selected from the group consisting of metal oxides having a Tammann temperature of 1200° C. or lower are contained within the above numerical range, the metal oxides function as a sintering aid, and therefore the zirconia powder is superior in low-temperature sinterability.

Since the zirconia sintered body contains alumina, a reduction in the toughness of a zirconia sintered body is likely to be suppressed. Furthermore, the translucency of the zirconia sintered body can be improved by adjusting the content of alumina.

The zirconia sintered body may or may not contain alumina or a metal oxide having a Tammann temperature of 1200° C. or lower. Specifically, the content of the alumina and one or more metal oxides selected from the group consisting of metal oxides having a Tammann temperature of 1200° C. or lower in the zirconia sintered body may be less than 0.005 mass %.

The zirconia sintered body may comprise sinterable ceramics, a thermosetting resin, or the like in addition to alumina and the metal oxide having a Tammann temperature of 1200° C. or lower for the purpose of improving such characteristics as strength.

The zirconia sintered body may contain one or more elements selected from the group consisting of Fe, V, Mn, Co, Zn, Cu, and Ti. When one or more elements selected from the group consisting of Fe, V, Mn, Co, Zn, Cu, and Ti are contained, the zirconia sintered body can be suitably colored.

The form of the element is not particularly limited, and the coloring element can be added in the form of an oxide or chloride or the like. Examples of the oxide containing the element include $Fe_2O_3$, $V_2O_5$, $MnO_2$, CoO, ZnO, CuO, and $TiO_2$.

When the $Fe_2O_3$ is contained, the content of the $Fe_2O_3$ is preferably 0.005 mass % or more and 1 mass % or less, and more preferably 0.05 mass % or more and 0.5 mass % or less where the entire amount of the zirconia powder is 100 mass %. When the content of the $Fe_2O_3$ is 0.005 mass % or more, intended coloring is easily obtained. That is, the color tone can be easily adjusted.

When the $V_2O_5$ is contained, the content of the $V_2O_5$ is preferably 0.005 mass % or more and 0.5 mass % or less, and more preferably 0.01 mass % or more and 0.1 mass % or less where the entire amount of the zirconia powder is 100 mass %. When the content of the $V_2O_5$ is 0.005 mass % or more, intended coloring is easily obtained. That is, the color tone can be easily adjusted.

When the $MnO_2$ is contained, the content of the $MnO_2$ is preferably 0.005 mass % or more and 2 mass % or less, and more preferably 0.1 mass % or more and 1.1 mass % or less where the entire amount of the zirconia powder is 100 mass %. When the content of the $MnO_2$ is 0.005 mass % or more, intended coloring is easily obtained. That is, the color tone can be easily adjusted.

When the CoO is contained, the content of the CoO is preferably 0.005 mass % or more and 2 mass % or less, and more preferably 0.01 mass % or more and 1.5 mass % or less where the entire amount of the zirconia powder is 100 mass %. When the content of the CoO is 0.005 mass % or more, intended coloring is easily obtained. That is, the color tone can be easily adjusted.

When the ZnO is contained, the content of the ZnO is preferably 0.005 mass % or more and 1 mass % or less, and more preferably 0.1 mass % or more and 0.5 mass % or less where the entire amount of the zirconia powder is 100 mass %. When the content of the ZnO is 0.005 mass % or more, intended coloring is easily obtained. That is, the color tone can be easily adjusted.

When CuO is contained as the colorant, the content of the colorant is preferably 0.005 mass % or more and 1 mass % or less, more preferably 0.05 mass % or more and 0.6 mass % or less, and still more preferably 0.1 mass % or more and 0.3 mass % or less where the entire amount of the zirconia powder is 100 mass %. When the content of the colorant is 0.005 mass % or more, intended coloring is easily obtained. That is, the color tone can be easily adjusted.

When the $TiO_2$ is contained, the content of the $TiO_2$ is preferably 0.005 mass % or more and 2 mass % or less, and more preferably 0.01 mass % or more and 1 mass % or less where the entire amount of the zirconia powder is 100 mass %. When the content of the $TiO_2$ is 0.005 mass % or more, intended coloring is easily obtained. That is, the color tone can be easily adjusted.

The zirconia sintered body according to the present embodiment can be obtained by pressureless sintering using the zirconia powder described above. Specifically, it can be obtained by, for example, the method for producing a zirconia sintered body.

The zirconia sintered body according to the present embodiment can be used as an industrial part, an aesthetic part, or a dental material. More specifically, the zirconia sintered body can be used for jewelry, watch parts, watch faces, artificial teeth, members for molding processing, wear resistant members, chemical resistant members, etc.

EXAMPLES

Hereinafter, the present invention will be described in detail with reference to Examples, but the present invention is not limited to the following Examples as long as the gist thereof is not deviated. The zirconia powder and the zirconia sintered body in each of Examples and Comparative Examples contain hafnium oxide as an unavoidable impurity in an amount of 1.3 to 2.5 mass % based on zirconium oxide (calculated by the following Formula (X)).

([Mass of hafnium oxide]/([mass of zirconium oxide]+[mass of hafnium oxide]))×100(%)    <Formula (X)>

Preparation of Zirconia Powder

Example 1

213 g of a 25 mass % aqueous sodium sulfate solution and 450 g of an aqueous zirconium oxychloride solution with a concentration of 16 mass % in terms of $ZrO_2$ (acid concentration: 1 N) were separately heated to 95° C. (step 1). Thereafter, the heated aqueous solutions were brought into contact with each other over 2 minutes such that the mass ratio of $SO_4^{2-}/ZrO_2$ in the mixed liquid was 0.50 (step 2).

Next, the obtained basic zirconium sulfate-containing reaction solution was aged by holding it at 95° C. for 4 hours to afford basic zirconium sulfate (step 3).

Next, the aged solution was cooled to room temperature, and then an aqueous yttrium chloride solution with a concentration of 10 mass % in terms of $Y_2O_3$ was added such that a concentration of $Y_2O_3$ was 1.5 mol %, and the mixture was uniformly mixed (step 4).

Next, a 25 mass % aqueous sodium hydroxide solution was added to the resulting mixed solution to neutralize the mixed solution until the pH reached 13 or higher, thereby a hydroxide precipitate was formed (step 5).

The obtained hydroxide precipitate was collected by filtration and sufficiently washed with water, and the obtained hydroxide was dried at 105° C. for 24 hours. The dried hydroxide was heat-treated at 860° C. (firing temperature) in the air for 2 hours to afford an unpulverized zirconia-based powder (yttria-stabilized zirconia-based powder) (step 6).

An alumina powder having an average particle diameter of primary particles of 0.1 μm was added to the obtained unpulverized yttria-stabilized zirconia-based powder in an amount of 0.25 mass % based on the yttria-stabilized zirconia-based powder, and the mixture was pulverized and mixed for 40 hours with a wet ball mill using water as a dispersion medium. Zirconia beads φ5 mm were used for the pulverization. The zirconia slurry obtained after the pulverization was dried at 110° C. to afford a zirconia powder according to Example 1.

Specifically, the above operation was performed with an apparatus as described with reference to FIG. 1.

Examples 2 to 19 and Comparative Examples 1 to 7

Zirconia powders according to Examples 2 to 19 and Comparative Examples 1 to 7 were obtained in the same manner as in Example 1 except that the amount of the aqueous yttrium chloride solution added was changed such that the amount of $Y_2O_3$ added was the amount shown in Table 1 and the amount of the alumina powder added was changed to the amount shown in Table 1.

Examples 20 to 21

Zirconia powders according to Examples 20 to 21 were obtained in the same manner as in Example 1 except that the aqueous yttrium chloride solution with a concentration of 10 mass % in terms of $Er_2O_3$ was added such that the concentration of $Er_2O_3$ was 1.6 mol % instead of adding the aqueous yttrium chloride solution.

Example 22

A zirconia powder according to Example 22 was obtained in the same manner as in Example 1 except that calcium carbonate ($CaCO_3$) was added such that the concentration thereof was 3.8 mol % in terms of CaO instead of adding the aqueous yttrium chloride solution.

Examples 23 to 25

Zirconia powders according to Examples 23 to 25 were obtained in the same manner as in Example 22 except that the amount of calcium carbonate added was changed such that the amount of CaO added was the amount shown in Table 1.

Example 26

A zirconia powder according to Example 26 was obtained in the same manner as in Example 1 except that the aqueous yttrium chloride solution with a concentration of 10 mass % in terms of $Yb_2O_3$ was added such that the concentration of $Yb_2O_3$ was 1.6 mol % instead of adding the aqueous yttrium chloride solution.

Example 27

A zirconia powder according to Example 27 was obtained in the same manner as in Example 1 except that the amount of the aqueous yttrium chloride solution added was changed such that the amount of $Y_2O_3$ added was the amount shown in Table 1 and 0.25 mass % of $Fe_2O_3$ was added.

Example 28

A zirconia powder according to Example 28 was obtained in the same manner as in Example 1 except that the amount of the aqueous yttrium chloride solution added was changed such that the amount of $Y_2O_3$ added was the amount shown in Table 1 and 0.05 mass % of ZnO was added.

Example 29

A zirconia powder according to Example 29 was obtained in the same manner as in Example 1 except that the amount of the aqueous yttrium chloride solution added was changed such that the amount of $Y_2O_3$ added was the amount shown in Table 1 and 0.05 mass % of $MnO_2$ was added.

Example 30

A zirconia powder according to Example 30 was obtained in the same manner as in Example 1 except that the amount of the aqueous yttrium chloride solution added was changed such that the amount of $Y_2O_3$ added was the amount shown in Table 1 and 0.05 mass % of CoO was added.

Example 31

A zirconia powder according to Example 31 was obtained in the same manner as in Example 1 except that the amount of the aqueous yttrium chloride solution added was changed such that the amount of $Y_2O_3$ added was the amount shown in Table 1 and 0.1 mass % of $TiO_2$ was added.

Example 32

A zirconia powder according to Example 32 was obtained in the same manner as in Example 1 except that the amount of the aqueous yttrium chloride solution added was changed such that the amount of $Y_2O_3$ added was the amount shown in Table 1 and 0.1 mass % of $Tb_4O_7$ was added.

Example 33

A zirconia powder according to Example 33 was obtained in the same manner as in Example 1 except that the amount of the aqueous yttrium chloride solution added was changed such that the amount of $Y_2O_3$ added was the amount shown in Table 1 and 0.3 mass % of CuO was added.

Example 34

A zirconia powder according to Example 34 was obtained in the same manner as in Example 1 except that the amount of the aqueous yttrium chloride solution added was changed such that the amount of $Y_2O_3$ added was the amount shown in Table 1 and the amount of the $MnO_2$ powder added was changed to 1.0 mass % instead of the alumina powder.

[Measurement of Specific Surface Area]

The specific surface area of the zirconia powder of each of Examples and Comparative Examples was measured by the BET method using a specific surface area meter ("Macsorb", manufactured by Mountec). The results are shown in Table 2.

[Measurement of Pore Volume]

The pore distribution of the zirconia powder of each of Examples and Comparative Examples was obtained by a mercury intrusion method using a pore distribution measuring device ("Autopore IV9500" manufactured by Micromeritics). The measurement conditions were set as follows.

<Measurement Conditions>

Measuring device: pore distribution measuring device (Autopore IV9500 manufactured by Micromeritics)

Measuring range: 0.0036 to 10.3 μm

Number of measurement points: 120 points

Mercury contact angle: 140 degrees

Mercury surface tension: 480 dyne/cm

Using the obtained pore distribution, a peak top diameter, a pore volume, and a pore distribution width in a range of 10 nm or more and 200 nm or less were determined. The results are shown in Table 2.

Here, the pore distribution width refers to a width of a peak at which the log differential pore volume is 0.1 ml/g or more.

Figure 2:
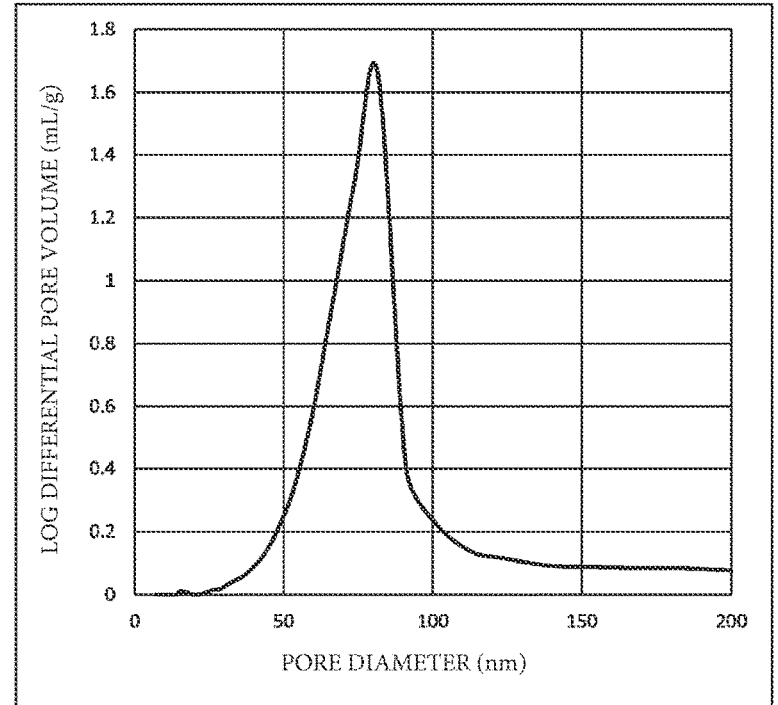
FIG. 2 is the pore distribution of the zirconia powder of Example 2.
Figure 3:
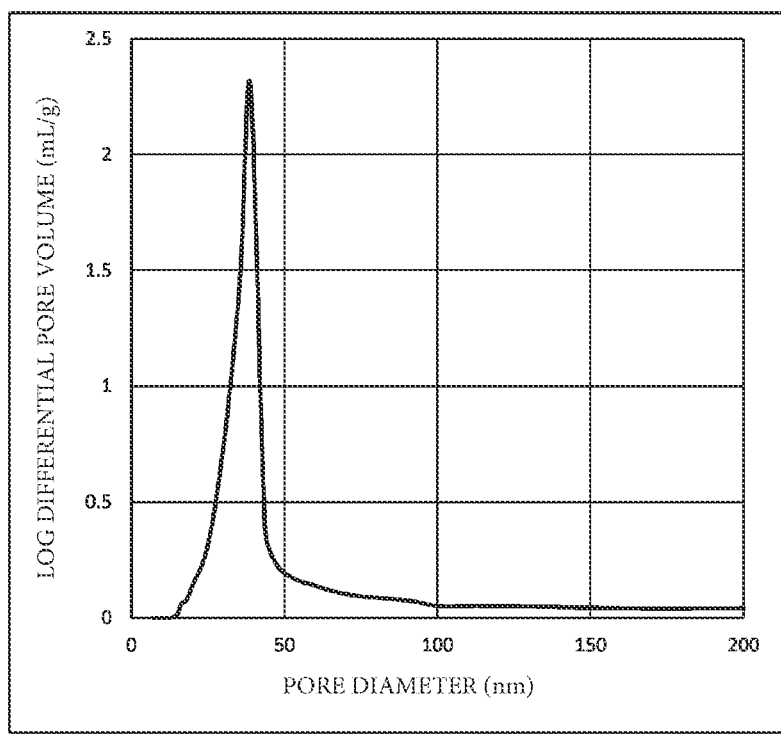
FIG. 3 is the pore distribution of the zirconia powder of Example 7.
Figure 4:
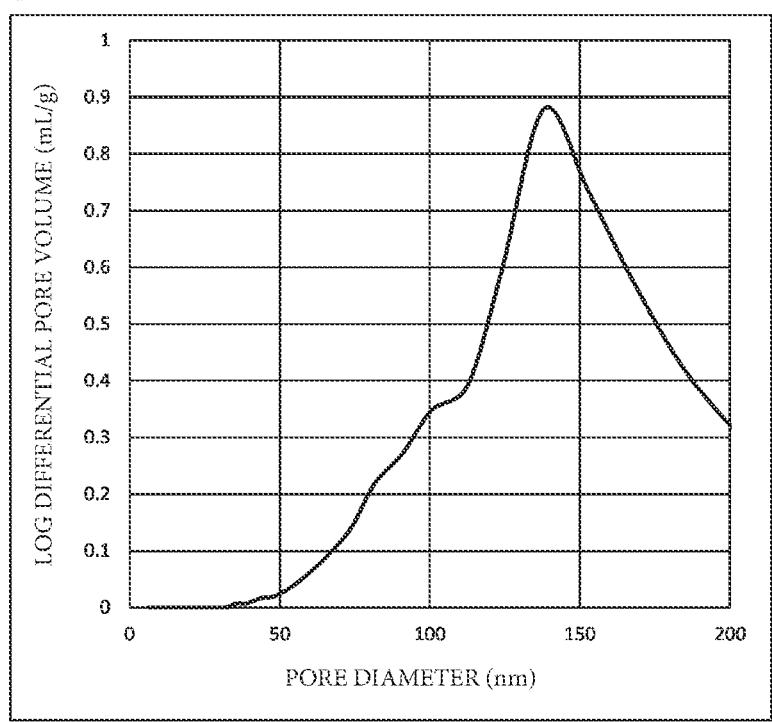
FIG. 4 is the pore distribution of the zirconia powder of Comparative Example 7.

For reference, the pore distribution of the zirconia powders of Examples 2 and 7 are shown in FIGS. 2 and 3, and the pore distribution of the zirconia powder of Comparative Example 7 is shown in FIG. 3.

[Composition Measurement]

The compositions (in terms of oxide) of the zirconia powders of Examples and Comparative Examples were analyzed using ICP-AES ("ULTIMA-2" manufactured by HORIBA). The Results are shown in Table 1.

[Measurement of Particle Diameter $D_{50}$]

0.15 g of the zirconia powder of each of Examples and Comparative Examples and 40 ml of a 0.2% sodium hexametaphosphate aqueous solution were placed in a 50-ml beaker, and dispersed in an ultrasonic homogenizer "Sonifier S-450D" (Emerson Japan, Ltd.) for 2 minutes, followed by placing the dispersed product in a device (laser diffraction type particle diameter distribution measuring device ("SALD-2300" manufactured by Shimadzu Corporation)) for measurement. The results are shown in Table 2.

[Preparation of Zirconia Sintered Body]

First, from the zirconia powder of each of Examples and Comparative Examples was manufactured a molded body by a cold isostatic pressing method (CIP). The molding pressure was set to 2 t/cm².

Next, the molded body was sintered at a temperature (sintering temperature) described in Table 3 for 2 hours, affording a zirconia sintered body.

[Identification of Crystal Phase]

X-ray diffraction spectra of the zirconia sintered bodies of Examples and Comparative Examples were obtained using an X-ray diffractometer ("RINT2500" manufactured by Rigaku Corporation). The measurement conditions were set as follows.

<Measurement Conditions>

Measuring apparatus: X-ray diffractometer (RINT2500, manufactured by Rigaku Corporation)

Radiation source: CuKα radiation source

Tube voltage: 50 kV

Tube current: 300 mA

Scanning speed: 2θ=26 to 36°: 4°/min

2θ=72 to 76°: 1°/min

Then, the crystal phase was identified from the X-ray diffraction spectrum. The phase ratio of each crystal phase included in the zirconia-based porous body was calculated by the following formula.

Monoclinic crystal phase ratio (%)=(Im(111)+Im(11–1))/(Im(111)+Im(11–1)+It(101)+Ic(111))×100

Here, Im(111) is the diffraction intensity of (111) in the monoclinic crystal phase, and Im(11-1) is the diffraction intensity of (11-1) in the monoclinic crystal phase.

It(101) is the diffraction intensity of (101) in the tetragonal crystal phase.

Ic(111) is the diffraction intensity of (111) in the cubic crystal phase.

A distinction of monoclinic crystal phase was made in the vicinity of 2θ=26 to 36° in the XRD spectrum. The tetragonal crystal phase was discriminated from the cubic crystal phase in the vicinity of 2θ=72 to 76° in the XRD spectrum. The cubic crystal phase may be distorted depending on the amount of the stabilizer added and the producing method, which may cause a peak position to shift. However, in the present Examples, a peak between (004) and (220) in the tetragonal crystal phase is calculated as the peak of the cubic crystal phase. The results are shown in Table 3.

[Crack Length]

Figure 5:
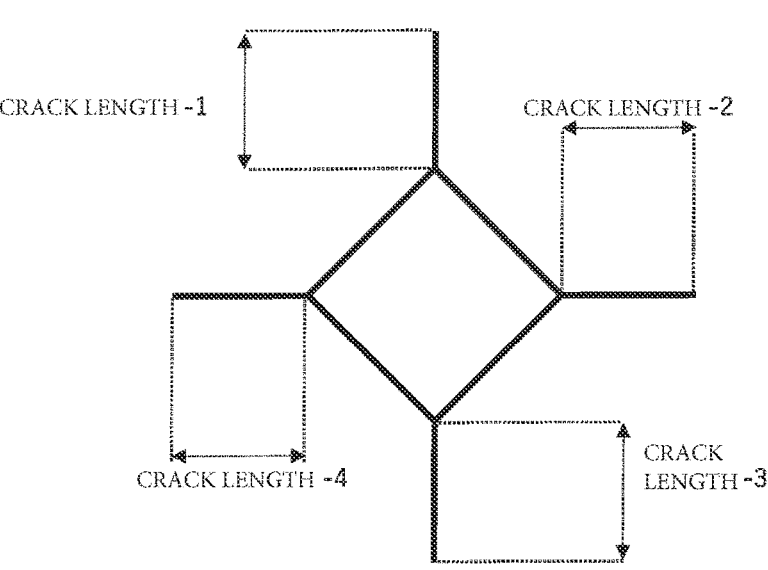
FIG. 5 is a schematic diagram for explaining a crack length.

Crack lengths of the zirconia sintered bodies of Examples and Comparative Examples obtained above were measured. Specifically, a load was set to 50 kgf (490.4 N) in toughness measurement by the IF method, and a length of a crack generated in a zirconia sintered body was measured. More specifically, the measurement was performed by a method in accordance with JIS R 1607 (Testing methods for fracture toughness of fine ceramics at room temperature). An indentation was pressed using a Vickers hardness meter, and an average value of lengths of four cracks extending from the indentation (crack lengths 1 to 4 in FIG. 5) was defined as a crack length. There is a case where an indentation with a normal shape is not formed depending on a place where the indentation is pressed. Therefore, five indentations satisfying three conditions of (1) the shape of the indentation is a quadrangle, (2) cracks are formed from the four corners and on the extensions of the diagonals of the indentation, and (3) a difference between crack lengths in two orthogonal directions is 10% or less of an average crack length are selected, and an average value of the crack lengths is adopted. In order to successfully observe the end points of the cracks of the indentation accurately, observation was performed using a coaxial single emission mode of an optical microscope (VHX-5000 manufactured by KEYENCE CORPORATION) by which scratches and irregularities were easily observed.

[Toughness Value]

Toughness values of the zirconia sintered bodies of Examples and Comparative Examples obtained above were determined. The toughness values were calculated by the following formula.

$$Kc=0.018 \times Hv \times a^{0.5} \times [(c-a)/a]^{-0.5} \times (Hv/E)^{-0.4}$$

Figure 6:
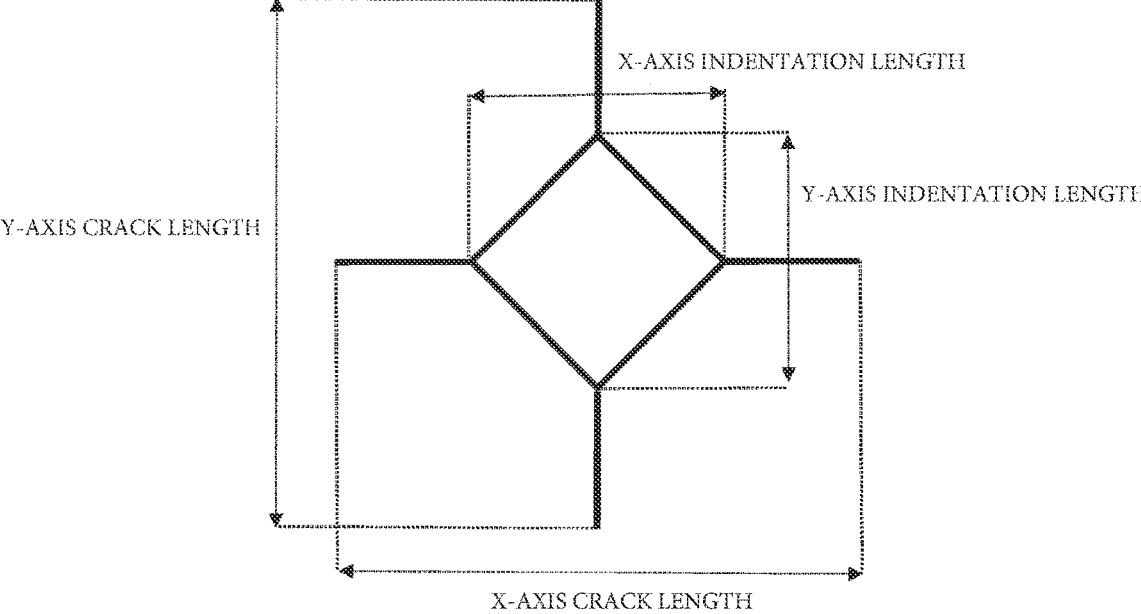
FIG. 6 is a schematic diagram for explaining an indentation length and a crack length.

Kc, Hv, a, c, and E mean the following. The indentation lengths in the X and Y axes and the crack lengths in the X and Y axes when determining a and c are as shown in FIG. 6.

Kc: Toughness value [MPa·m$^{0.5}$]

Hv: Vickers hardness [GPa]

a: Half of average value of indentation lengths in X and Y axes [μm]

c: Half of average value of crack lengths in X and Y axes [μm]

E: Young's modulus [GPa]

The Vickers hardness was determined in accordance with JIS R 1610 (Test methods for hardness of fine ceramics). The Vickers hardness was calculated by the following formula.

$$Hv=0.001854 \times [F/d^2 Sv]$$

F and d mean the following. The X-axis indentation length and the Y-axis indentation length when d is determined are as shown in FIG. 6.

Hv: Vickers hardness [GPa]

F: Test force [N]

d: Average value of X-axis indentation length and Y-axis indentation length [mm]

As the Young's modulus, 210 GPa, which is known as a value of common yttria-stabilized zirconia, was used.

In Example 5 and Comparative Example 5, toughness values were also determined when the load was set to 10 kgf and 30 kgf. As can be seen from these results, the lower the weight, the higher the toughness value obtained tends to be. When the load is low, cracks hardly extend from an indentation and a correct toughness value cannot be measured. Therefore, it is desirable to measure the toughness value at a load as high as possible.

For example, in Comparative Example 5, when the measurement load is 10 kgf, the toughness value is 15 MPa·m$^{0.5}$, whereas when the measurement load is 20 kgf, the toughness value is 7 MPa·m$^{0.5}$. In the present description, the toughness value is measured at a measurement load of 50 kgf in order to accurately measure the toughness value, and it is apparent from the above results that the toughness value to be obtained varies when the measurement load varies.

[Three-Point Bending Strength]

The three-point bending strength of the zirconia sintered bodies of Examples and Comparative Examples obtained above was measured in accordance with the three-point bending strength of JIS R 1601. The results are shown in Table 3.

[Relative Sintered Density]

The relative sintered density of the obtained zirconia sintered bodies was determined as follows. The results are shown in Table 3. In Tables 3, "–" indicates that measurement was not performed.

relative sintered density (%)=(sintered density/theoretical sintered density)×100    (1)

Here, the theoretical sintered density ($\rho_0$) is a value calculated by the following formula (2-1).

$$\rho_0=100/[(Y/3.987)+(100-Y)/\rho z] \quad (2\text{-}1)$$

However, ρz is a value calculated by the following formula (2-2).

$$\rho z=[124.25(100-X)+[\text{molecular weight of stabilizer}] \times X]/[150.5(100+X)A^2 C] \quad (2\text{-}2)$$

Here, as the molecular weight of the stabilizer is used 225.81 when the stabilizer is Y$_2$O$_3$, 382.52 when the stabilizer is Er$_2$O$_3$, and 394.11 when the stabilizer is Yb$_2$O$_3$.

X and Y are a stabilizer concentration (mol %) and an alumina concentration (wt %), respectively. A and C are respectively values calculated by the following formulae (2-3) and (2-4).

$$A=0.5080+0.06980X/(100+X) \quad (2\text{-}3)$$

$$C=0.5195-0.06180X/(100+X) \quad (2\text{-}4)$$

In the formula (1), the theoretical sintered density varies depending on the composition of the powder. For example, the theoretical sintered density of yttria-containing zirconia is 6.117 g/cm³ when the yttria content is 2 mol %, 6.098 g/cm³ when the yttria content is 3 mol %, and 6.051 g/cm³ when the yttria content is 5.5 mol % (in the case of $Al_2O_3$=0).

When the stabilizer is CaO, $\rho z$ is a value calculated by the following formula (3).

$$\rho z = -0.0400(\text{molar concentration of CaO}) + 6.1700 \qquad (3)$$

The theoretical sintered density (denoted by $\rho 1$) in the case of containing a colorant is $$\rho 1 = 100/[(Z/V) + (100-Z)/\rho 0] \qquad (2\text{-}5).$$

Z is a concentration (% by weight) of the colorant, and V is a theoretical density (g/cm³) of the colorant.

The theoretical density of the colorant was 5.24 g/cm³ for $Fe_2O_3$, 5.61 g/cm³ for ZnO, 5.03 g/cm³ for $MnO_2$, 6.10 g/cm³ for CoO, 4.23 g/cm³ for $TiO_2$, 7.80 g/cm³ for $Tb_4O_7$, and 6.31 g/cm³ for CuO.

The sintered density was measured by the Archimedes method.

<Relative Molding Density>

Relative molding density (%)=(molding density/theoretical sintered density)×100    (4)

Here, the theoretical sintered density ($\rho 0$) is a value calculated by the above formula (2-1).

[Evaluation of Resistance to Hydrothermal Degradation]

The zirconia sintered bodies of Examples and Comparative Examples were exposed to a hydrothermal condition at 134° C. for 75 hours. Thereafter, the monoclinic crystal phase ratio of a surface was measured. The method for measuring the monoclinic crystal phase ratio is the same as that described in the section of "Identification of crystal phase" above. The results are shown in Table 3.

TABLE 1

| | Stabilizer | | | | Additive (sintering aid and/or colorant) | | | | | | | |
|---|---|---|---|---|---|---|---|---|---|---|---|---|
| | $Y_2O_3$ mol % | CaO mol % | $Er_2O_3$ mol % | $Yb_2O_3$ mol % | $Al_2O_3$ mass % | $Fe_2O_3$ mass % | ZnO mass % | $MnO_2$ mass % | CoO mass % | $TiO_2$ mass % | $Tb_4O_7$ mass % | CuO mass % |
| Comparative Example 1 | 1.3 | — | — | — | 0.25 | — | — | — | — | — | — | — |
| Example 1 Example 2 | 1.5 | — | — | — | 0.25 | — | — | — | — | — | — | — |
| Example 3 Example 4 | 1.6 | — | — | — | 0.25 | — | — | — | — | — | — | — |
| Example 5 | 1.6 | — | — | — | 0.25 | — | — | — | — | — | — | — |
| Example 6 Example 7 | 1.6 | — | — | — | 0.50 | — | — | — | — | — | — | — |
| Example 8 | 1.6 | — | — | — | 0.25 | — | — | — | — | — | — | — |
| Example 9 | 1.6 | — | — | — | 0.10 | — | — | — | — | — | — | — |
| Example 10 | 1.6 | — | — | — | 0.25 | — | — | — | — | — | — | — |
| Example 11 Example 12 | 1.6 | — | — | — | 0.25 | — | — | — | — | — | — | — |
| Example 13 Example 14 | 1.7 | — | — | — | 0.25 | — | — | — | — | — | — | — |
| Example 15 | 1.8 | — | — | — | 0.25 | — | — | — | — | — | — | — |
| Example 16 Example 17 | 1.8 | — | — | — | 0.25 | — | — | — | — | — | — | — |
| Example 18 | 1.9 | — | — | — | 0.25 | — | — | — | — | — | — | — |
| Example 19 | 1.9 | — | — | — | 0.25 | — | — | — | — | — | — | — |
| Comparative Example 2 Comparative Example 3 | 2.0 | — | — | — | 0.25 | — | — | — | — | — | — | — |
| Comparative Example 4 Comparative Example 5 Comparative Example 6 | 2.0 | — | — | — | 0.25 | — | — | — | — | — | — | — |
| Example 20 Example 21 | — | — | 1.6 | — | 0.25 | — | — | — | — | — | — | — |
| Example 22 | — | 3.8 | — | — | 0.25 | — | — | — | — | — | — | — |
| Example 23 | — | 4.0 | — | — | 0.25 | — | — | — | — | — | — | — |
| Example 24 | — | 4.2 | — | — | 0.25 | — | — | — | — | — | — | — |
| Example 25 | — | 4.4 | — | — | 0.25 | — | — | — | — | — | — | — |
| Example 26 | — | — | — | 1.6 | 0.25 | — | — | — | — | — | — | — |
| Example 27 | 1.6 | — | — | — | 0.25 | 0.25 | — | — | — | — | — | — |
| Example 28 | 1.6 | — | — | — | 0.25 | — | 0.05 | — | — | — | — | — |
| Example 29 | 1.6 | — | — | — | 0.25 | — | — | 0.05 | — | — | — | — |
| Example 30 | 1.6 | — | — | — | 0.25 | — | — | — | 0.05 | — | — | — |
| Example 31 | 1.6 | — | — | — | 0.25 | — | — | — | — | 0.1 | — | — |
| Example 32 | 1.6 | — | — | — | 0.25 | — | — | — | — | — | 0.1 | — |
| Example 33 | 1.6 | — | — | — | 0.25 | — | — | — | — | — | — | 0.3 |
| Comparative Example 7 | 1.9 | — | — | — | 0.25 | — | — | — | — | — | — | — |
| Example 34 | 1.7 | — | — | — | — | — | — | 1.0 | — | — | — | — |

TABLE 2

| | Powder properties | | | | |
|---|---|---|---|---|---|
| | Specific surface area m²/g | Average particle diameter μm | Peak top diameter nm | Pore distribution width nm | Pore volume mL/g |
| Comparative Example 1 | 29 | 0.15 | 46 | 55 | 0.34 |
| Example 1 | 30 | 0.11 | 43 | 54 | 0.30 |
| Example 2 | 17 | 0.15 | 82 | 80 | 0.30 |
| Example 3 | | | | | |
| Example 4 | 28 | 0.12 | 48 | 45 | 0.31 |
| Example 5 | | | | | |
| Example 6 | 31 | 0.43 | 48 | 44 | 0.32 |
| Example 7 | 40 | 0.60 | 39 | 46 | 0.36 |
| Example 8 | | | | | |
| Example 9 | 38 | 0.50 | 38 | 46 | 0.37 |
| Example 10 | 17 | 0.40 | 113 | 138 | 0.31 |
| Example 11 | 25 | 0.44 | 91 | 127 | 0.36 |
| Example 12 | | | | | |
| Example 13 | 28 | 0.12 | 44 | 53 | 0.31 |
| Example 14 | | | | | |
| Example 15 | 13 | 0.44 | 101 | 93 | 0.25 |
| Example 16 | 28 | 0.12 | 44 | 53 | 0.31 |
| Example 17 | | | | | |
| Example 18 | 13 | 0.21 | 101 | 79 | 0.26 |
| Example 19 | 29 | 0.13 | 44 | 56 | 0.30 |
| Comparative Example 2 | 29 | 0.15 | 44 | 53 | 0.31 |
| Comparative Example 3 | | | | | |

TABLE 2-continued

| | Powder properties | | | | |
|---|---|---|---|---|---|
| | Specific surface area m²/g | Average particle diameter μm | Peak top diameter nm | Pore distribution width nm | Pore volume mL/g |
| Comparative Example 4 | 27 | 0.47 | 101 | 145 | 0.36 |
| Comparative Example 5 | | | | | |
| Comparative Example 6 | | | | | |
| Example 20 | 31 | 0.14 | 44 | 60 | 0.37 |
| Example 21 | | | | | |
| Example 22 | 27 | 0.28 | 81 | 110 | 0.36 |
| Example 23 | 27 | 0.29 | 82 | 106 | 0.39 |
| Example 24 | 24 | 0.23 | 80 | 106 | 0.27 |
| Example 25 | 25 | 0.24 | 91 | 121 | 0.38 |
| Example 26 | 25 | 0.25 | 51 | 46 | 0.30 |
| Example 27 | 24 | 0.15 | 50 | 45 | 0.31 |
| Example 28 | 24 | 0.15 | 48 | 46 | 0.33 |
| Example 29 | 29 | 0.17 | 50 | 45 | 0.29 |
| Example 30 | 29.9 | 0.16 | 49 | 41 | 0.29 |
| Example 31 | 26 | 0.15 | 50 | 47 | 0.32 |
| Example 32 | 25 | 0.15 | 50 | 45 | 0.31 |
| Example 33 | 29 | 0.18 | 49 | 45 | 0.31 |
| Comparative Example 7 | 8 | 0.7 | 138 | Out of range | 0.19 |
| Example 34 | 37.5 | 0.21 | 47 | 70 | 0.45 |

TABLE 3

| | Physical properties of sintered body | | | | | | | | |
|---|---|---|---|---|---|---|---|---|---|
| | Sintering temperature °C. | Monoclinic crystal phase ratio (%) % | Toughness 10 kgf MPa·m$^{0.5}$ | Toughness 30 kgf MPa·m$^{0.5}$ | Toughness 50 kgf MPa·m$^{0.5}$ | Crack length 50 kgf μm | Relative density % | Strength kg/mm$^2$ | Amount of monoclinic crystal phase after hydrothermal degradation % |
| Comparative Example 1 | 1200 | 90 | — | — | — | — | Cracking | Unmeasurable | — |
| Example 1 | 1200 | 0.3 | — | — | 36 | 3 | 99.59 | 105 | 19.8 |
| Example 2 | 1200 | 1 | — | — | 17 | 32 | 97.60 | 102 | 23.2 |
| Example 3 | 1250 | 1.4 | — | — | 20 | 20 | 99.75 | 110 | 31.1 |
| Example 4 | 1200 | 0.5 | — | — | 18 | 22 | 99.53 | 102 | 18.9 |
| Example 5 | 1250 | 1.4 | 45 | 25 | 20 | 22 | 99.75 | 110 | 29.8 |
| Example 6 | 1200 | 0.4 | — | — | 15 | 39 | 99.31 | 118 | — |
| Example 7 | 1200 | 1 | — | — | 22 | 19 | 99.62 | 113 | 18.9 |
| Example 8 | 1250 | 1.4 | — | — | 24 | 17 | 99.58 | 121 | 31.1 |
| Example 9 | 1200 | 0.7 | — | — | 17 | 31 | 99.30 | 110 | — |
| Example 10 | 1250 | 0.9 | — | — | 18 | 26 | 99.02 | 116 | — |
| Example 11 | 1200 | 0.7 | — | — | 15 | 37 | 97.88 | 118 | — |
| Example 12 | 1250 | 2.1 | — | — | 19 | 24 | 99.51 | 115 | — |
| Example 13 | 1200 | 0.3 | — | — | 13 | 41 | 99.57 | 109 | 15.7 |
| Example 14 | 1250 | 0.5 | — | — | 16 | 33 | 99.79 | 123 | 20.6 |
| Example 15 | 1350 | 0.3 | — | — | 14 | 40 | 99.71 | 119 | — |
| Example 16 | 1200 | 0.2 | — | — | 12 | 51 | 99.56 | 109 | 17.1 |
| Example 17 | 1250 | 0.2 | — | — | 14 | 47 | 99.80 | 117 | 17.0 |
| Example 18 | 1350 | 0.2 | — | — | 16 | 47 | 99.78 | 122 | 25.7 |
| Example 19 | 1250 | 0.2 | — | — | 10 | 88 | 99.80 | 110 | 18.7 |
| Comparative Example 2 | 1200 | 0.1 | — | — | 6 | 190 | 99.63 | 117 | 73.9 |
| Comparative Example 3 | 1250 | 0.1 | — | — | 6 | 219 | 99.78 | 116 | 39.8 |
| Comparative Example 4 | 1200 | 0.1 | — | — | 6 | 217 | 97.10 | 119 | 73.9 |
| Comparative Example 5 | 1250 | 0.1 | 15 | 7 | 6 | 215 | 99.35 | 123 | 39.8 |
| Comparative Example 6 | 1300 | 0.1 | — | — | 6 | 217 | 99.62 | 127 | — |
| Example 20 | 1200 | 0.6 | — | — | 19 | 24 | 99.58 | 102 | 24.7 |
| Example 21 | 1250 | 1.0 | — | — | 20 | 22 | 99.62 | 116 | 31.2 |

TABLE 3-continued

| | | | | | Physical properties of sintered body | | | | |
|---|---|---|---|---|---|---|---|---|---|
| | Sintering temperature ° C. | Monoclinic crystal phase ratio (%) % | Toughness 10 kgf MPa · m$^{0.5}$ | Toughness 30 kgf MPa · m$^{0.5}$ | Toughness 50 kgf MPa · m$^{0.5}$ | Crack length 50 kgf μm | Relative density % | Strength kg/mm$^2$ | Amount of monoclinic crystal phase after hydrothermal degradation % |
| Example 22 | 1250 | 2.5 | — | — | 18 | 27 | 99.47 | 93 | 2.5 |
| Example 23 | 1250 | 2.9 | — | — | 27 | 12 | 99.47 | 105 | — |
| Example 24 | 1250 | 0.8 | — | — | 26 | 25 | 99.39 | 108 | 0.9 |
| Example 25 | 1250 | 0.7 | — | — | 17 | 36 | 99.45 | 107 | — |
| Example 26 | 1250 | 0.5 | — | — | 15 | 40 | 99.80 | 95 | — |
| Example 27 | 1250 | 0.7 | — | — | 15 | 38 | 99.30 | 102 | — |
| Example 28 | 1200 | 0.5 | — | — | 15 | 38 | 99.34 | 104 | — |
| Example 29 | 1200 | 0.4 | — | — | 14 | 40 | 99.06 | 100 | — |
| Example 30 | 1200 | 0.5 | — | — | 15 | 38 | 99.56 | 101 | — |
| Example 31 | 1250 | 0.4 | — | — | 15 | 39 | 99.59 | 107 | — |
| Example 32 | 1250 | 0.7 | — | — | 13 | 50 | 99.50 | 112 | — |
| Example 33 | 1200 | 0.9 | — | — | 15 | 37 | 99.76 | 104 | — |
| Comparative Example 7 | 1250 | 0.1 | — | — | Unmeasurable | Unmeasurable | — | Unmeasurable | — |
| Example 34 | 1200 | 2.0 | — | — | 20 | 23 | 99.7 | 99 | 15.2 |

The invention claimed is:

1. A zirconia powder comprising a stabilizer, wherein the stabilizer is CaO, Y$_2$O$_3$, Er$_2$O$_3$, or Yb$_2$O$_3$, when the stabilizer is Y$_2$O$_3$, a content of the Y$_2$O$_3$ based on an entire amount of the zirconia powder is 1.4 mol % or more and less than 2.0 mol %, when the stabilizer is Er$_2$O$_3$, a content of the Er$_2$O$_3$ based on an entire amount of the zirconia powder is 1.4 mol % or more and 1.8 mol % or less, when the stabilizer is Yb$_2$O$_3$, a content of the Yb$_2$O$_3$ based on an entire amount of the zirconia powder is 1.4 mol % or more and 1.8 mol % or less, and when the stabilizer is CaO, a content of the CaO based on an entire amount of the zirconia powder is 3.5 mol % or more and 4.5 mol % or less, in a range of 10 nm or more and 200 nm or less in a pore distribution based on a mercury intrusion method, a peak top diameter in a pore volume distribution is 20 nm or more and 120 nm or less, a pore volume is 0.2 ml/g or more and less than 0.5 ml/g, and a pore distribution width is 30 nm or more and 170 nm or less, and the zirconia powder includes a property of, upon being sintered under conditions at 1200° C. or higher and 1350° C. or lower and for 1 hour or more and 5 hours or less, producing a zirconia sintered body wherein a ratio of a monoclinic crystal phase contained in a crystal phase is 0.2% or more and 2.9% or less.

2. The zirconia powder according to claim 1, wherein a specific surface area is 10 m$^2$/g or more and 50 m$^2$/g or less, and a particle diameter D$_{50}$ is 0.1 μm or more and 0.7 μm or less.

3. The zirconia powder according to claim 1, wherein the peak top diameter is 20 nm or more and 70 nm or less, and the pore distribution width is 40 nm or more and 105 nm or less.

4. The zirconia powder according to claim 1, wherein when the stabilizer is Y$_2$O$_3$, the content of the Y$_2$O$_3$ is 1.4 mol % or more and 1.9 mol % or less.

5. The zirconia powder according to claim 1, wherein when the stabilizer is Y$_2$O$_3$, the content of the Y$_2$O$_3$ is 1.4 mol % or more and less than 1.8 mol %.

6. The zirconia powder according to claim 2, wherein the specific surface area is 20 m$^2$/g or more and 40 m$^2$/g or less.

7. The zirconia powder according to claim 2, wherein the particle diameter D$_{50}$ is 0.1 μm or more and less than 0.3 μm.

8. The zirconia powder according to claim 1, further comprising alumina and one or more metal oxides selected from the group consisting of metal oxides having a Tammann temperature of 1200° C. or lower, wherein a combined amount of the alumina and the one or more metal oxides in the zirconia powder is 0.005 mass % or more and 2 mass % or less.

9. The zirconia powder according to claim 1, wherein the zirconia powder comprises one or more elements selected from the group consisting of Fe, V, Er, Mn, Co, Tb, Zn, Cu, and Ti.

10. A zirconia sintered body, comprising a stabilizer, wherein the stabilizer is one or more compounds selected from the group consisting of CaO, Y$_2$O$_3$, Er$_2$O$_3$, and Yb$_2$O$_3$, when the stabilizer is only Y$_2$O$_3$, a content of the Y$_2$O$_3$ based on an entire amount of a zirconia powder used to make the zirconia sintered body is 1.4 mol % or more and less than 1.8 mol %, when the stabilizer is only Er$_2$O$_3$, a content of the Er$_2$O$_3$ based on an entire amount of a zirconia powder used to make the zirconia sintered body is 1.4 mol % or more and 1.8 mol % or less, when the stabilizer is only Yb$_2$O$_3$, a content of the Yb$_2$O$_3$ based on an entire amount of a zirconia powder used to make the zirconia sintered body is 1.4 mol % or more and 1.8 mol % or less, and when the stabilizer is only CaO, a content of the CaO based on an entire amount of a zirconia powder used to make the zirconia sintered body zirconia powder is 3.5 mol % or more and 4.5 mol % or less, and a ratio of a monoclinic crystal phase contained in a crystal phase is 0.2% or more and 2.9% or less, a length of a crack generated in the sintered body when a load is set to 50 kgf in toughness measurement by an IF method is 1 μm or more and 90 μm or less, and a three-point bending strength is 80 kg/mm$^2$ or more and 150 kg/mm$^2$ or less.

11. The zirconia sintered body according to claim 10, wherein a relative sintered density is 99% or more.

12. The zirconia sintered body according to claim 10, wherein the zirconia sintered body has a toughness value of 10 MPa·m$^{0.5}$ or more and 40 MPa·m$^{0.5}$ or less when the load is 50 kgf in toughness measurement by an IF method.

13. The zirconia sintered body according to claim 10, wherein the zirconia sintered body comprises one or more elements selected from the group consisting of Fe, V, Mn, Co, Zn, Cu, and Ti.

14. The zirconia sintered body according to claim 10, wherein a monoclinic crystal phase ratio of a surface is 32% or less after the zirconia sintered body is exposed to a hydrothermal condition at 134° C. for 75 hours.

15. A method for producing a zirconia sintered body, the method comprising:

step X of molding the zirconia powder according to claim 1 to obtain a molded body; and step Y of sintering the molded body under conditions at 1200° C. or higher and 1350° C. or lower and for 1 hour or more and 5 hours or less after the step X.

16. The zirconia powder according to claim 1, wherein when the stabilizer is Y$_2$O$_3$, the content of the Y$_2$O$_3$ is 1.4 mol % or more and 1.75 mol % or less.

17. The zirconia powder according to claim 1, wherein when the stabilizer is Y$_2$O$_3$, the content of the Y$_2$O$_3$ is 1.4 mol % or more and 1.7 mol % or less.

18. The zirconia sintered body according to claim 10, wherein when the stabilizer is Y$_2$O$_3$, the content of the Y$_2$O$_3$ is 1.4 mol % or more and 1.75 mol % or less.

19. The zirconia sintered body according to claim 10, wherein when the stabilizer is Y$_2$O$_3$, the content of the Y$_2$O$_3$ is 1.4 mol % or more and 1.7 mol % or less.

* * * * *